US012803871B2

(12) United States Patent
Yamane et al.

(10) Patent No.: US 12,803,871 B2
(45) Date of Patent: Nov. 17, 2026

(54) MANAGEMENT DEVICE, VEHICLE COMMUNICATION MANAGEMENT METHOD, AND VEHICLE COMMUNICATION MANAGEMENT PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP); TOYOTA JIDOSHA KABUSHIKI KAISHA, Toyota (JP)

(72) Inventors: Ryo Yamane, Osaka (JP); Tatsuya Izumi, Osaka (JP); Hideyuki Tanaka, Osaka (JP); Yusuke Yamamoto, Osaka (JP); Yoshio Ito, Osaka (JP); Kenta Ogata, Osaka (JP); Makoto Chujo, Osaka (JP); Yoshitaka Kikuchi, Yokkaichi (JP); Darmawan Go, Yokkaichi (JP); Hirofumi Urayama, Yokkaichi (JP); Hideki Goto, Toyota (JP); Yasuhiro Yamasaki, Toyota (JP); Ikuyoshi Otake, Toyota (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 19/099,723

(22) PCT Filed: May 23, 2023

(86) PCT No.: PCT/JP2023/019103

§ 371 (c)(1),
(2) Date: Jan. 29, 2025

(87) PCT Pub. No.: WO2024/029165

PCT Pub. Date: Feb. 8, 2024

(65) Prior Publication Data

US 2026/0039543 A1 Feb. 5, 2026

(30) Foreign Application Priority Data

Aug. 2, 2022 (JP) ................................ 2022-123581

(51) Int. Cl.
*H04L 41/0806* (2022.01)
*H04L 67/12* (2022.01)

(52) U.S. Cl.
CPC .......... *H04L 41/0806* (2013.01); *H04L 67/12* (2013.01)

(58) Field of Classification Search
None
See application file for complete search history.

(56) References Cited

U.S. PATENT DOCUMENTS 10,599,418 B2 * 3/2020 Kiyama .................. H04L 67/12
11,956,314 B2 * 4/2024 Yamamoto .............. H04L 12/28
(Continued)

FOREIGN PATENT DOCUMENTS

JP 2003-078537 A 3/2003
JP 2010-191953 A 9/2010
JP 2020-141318 A 9/2020

*Primary Examiner* — Backhean Tiv
(74) *Attorney, Agent, or Firm* — Oliff PLC

(57) ABSTRACT

A vehicle communication management device includes (i) a detection circuitry configured to detect addition of a function circuitry to a network including one or a plurality of in-vehicle function circuitries, (ii) an acquisition circuitry, and (iii) a generation circuitry. The acquisition circuitry is configured to acquire function circuitry information of each in-vehicle function circuitry, and if target information, which is function circuitry information of a new function circuitry that is the function circuitry the addition of which has been detected by the detection circuitry, cannot be acquired from the new function circuitry, acquire the target information by transmitting a lacking information notification for requesting a user to provide the target information. The generation circuitry is configured to, based on each function circuitry information acquired by the acquisition circuitry, generate configuration information of a new network which is the network further including the new function circuitry.

9 Claims, 18 Drawing Sheets

(56) References Cited

U.S. PATENT DOCUMENTS

| | | | | |
|---|---|---|---|---|
| 12,075,463 | B2 * | 8/2024 | Yamamoto | H04L 12/28 |
| 12,113,665 | B2 * | 10/2024 | Suyama | B60R 16/023 |
| 12,375,345 | B2 * | 7/2025 | Suyama | H04L 41/0806 |
| 2014/0068099 | A1 * | 3/2014 | Komori | H04L 45/745 709/236 |
| 2017/0331767 | A1 * | 11/2017 | Zinner | H04L 1/08 |
| 2018/0074811 | A1 * | 3/2018 | Kiyama | H04L 67/12 |
| 2021/0397433 | A1 * | 12/2021 | Itatsu | H04L 67/34 |
| 2021/0400452 | A1 * | 12/2021 | Baba | H04L 45/645 |
| 2022/0126770 | A1 * | 4/2022 | Itatsu | B60R 16/0234 |
| 2022/0158900 | A1 * | 5/2022 | Yamamoto | H04L 12/28 |
| 2022/0183052 | A1 * | 6/2022 | Yamamoto | H04L 12/28 |
| 2023/0069461 | A1 * | 3/2023 | Okuyama | G06F 21/57 |
| 2026/0039543 | A1 * | 2/2026 | Yamane | H04L 41/0806 |

* cited by examiner

FIG. 10

| CONFIGURATION ID | VEHICLE MAKER | VEHICLE MODEL | ID OF APPLICATION IN EXISTING NETWORK | ID OF APPLICATION TO BE ADDED | SUCCESS/ FAILURE INFORMATION |
|---|---|---|---|---|---|
| 00001 | COMPANY A | aaaa | ID-A,ID-B,ID-C | ID-G | SUCCESS |
| 00002 | COMPANY A | aaaa | | ID-H | SUCCESS |
| 00003 | COMPANY A | aaaa | | ID-I | SUCCESS |
| 00004 | COMPANY A | aaaa | | ID-G,ID-H | SUCCESS |
| 00005 | COMPANY A | aaaa | | ID-G,ID-I | FAILURE |
| 00006 | COMPANY A | aaaa | | ID-H,ID-I | FAILURE |
| 00007 | COMPANY A | aaaa | | ID-G,ID-H,ID-I | NONE (UNVERIFIED) |
| 00008 | COMPANY A | bbbb | | ID-G | SUCCESS |
| 00009 | COMPANY A | bbbb | | ID-H | SUCCESS |
| 00010 | COMPANY A | bbbb | | ID-I | SUCCESS |
| 00011 | COMPANY A | bbbb | | ID-G,ID-H | FAILURE |
| 00012 | COMPANY A | bbbb | | ID-G,ID-I | NONE (UNVERIFIED) |
| 00013 | COMPANY A | bbbb | | ID-H,ID-I | NONE (UNVERIFIED) |
| 00014 | COMPANY A | bbbb | | ID-G,ID-H,ID-I | FAILURE |
| 00015 | COMPANY B | aaaa | | ID-G | SUCCESS |
| 00016 | COMPANY B | aaaa | | ID-H | SUCCESS |
| 00017 | COMPANY B | aaaa | | ID-I | SUCCESS |
| 00018 | COMPANY B | aaaa | | ID-G,ID-H | FAILURE |
| ⋮ | ⋮ | ⋮ | ⋮ | ⋮ | ⋮ |
| 00101 | COMPANY A | aaaa | ID-A, ID-B, ID-D | ID-E | SUCCESS |
| 00102 | COMPANY A | aaaa | | ID-F | SUCCESS |
| 00103 | COMPANY A | aaaa | | ID-G | NONE (UNVERIFIED) |
| ⋮ | ⋮ | ⋮ | ⋮ | ⋮ | ⋮ |
| 00218 | COMPANY C | cccc | ID-A, ID-B | ID-C | FAILURE |
| 00219 | COMPANY C | cccc | | ID-D | FAILURE |
| 00220 | COMPANY C | cccc | | ID-C,ID-D | SUCCESS |
| ⋮ | ⋮ | ⋮ | ⋮ | ⋮ | ⋮ |

FIG. 11

| CONFIGURATION ID | HARDWARE DEVICE | PORT NUMBER | VID |
|---|---|---|---|
| 00001 | TCU111A | 1 | VLAN10 |
| 00001 | INTAKE PRESSURE SENSOR 111B | 1 | VLAN20 |
| 00001 | ENGINE ECU 111C | 1 | VLAN20 |
| 00001 | TEMPERATURE SENSOR 111D | 1 | VLAN30 |
| 00001 | WATER TEMPERATURE SENSOR 111E | 1 | VLAN30 |
| 00001 | RELAY DEVICE 112 | 1 | VLAN10 |
| 00001 | RELAY DEVICE 112 | 2 | VLAN20 |
| 00001 | RELAY DEVICE 112 | 3 | VLAN20, VLAN30 |
| 00001 | IMAGE SENSOR 111G | 1 | VLAN20 |
| 00002 | TCU111A | 1 | VLAN10 |
| 00002 | INTAKE PRESSURE SENSOR 111B | 1 | VLAN20 |
| | ⋮ | ⋮ | ⋮ |
| 00101 | TCU111A | 1 | VLAN10 |
| 00101 | INTAKE PRESSURE SENSOR 111B | 1 | VLAN20 |
| 00101 | ENGINE ECU 111C | 1 | VLAN20 |
| | ⋮ | ⋮ | ⋮ |

MANAGEMENT DEVICE, VEHICLE COMMUNICATION MANAGEMENT METHOD, AND VEHICLE COMMUNICATION MANAGEMENT PROGRAM

TECHNICAL FIELD

The present disclosure relates to a management device, a vehicle communication management method, and a vehicle communication management program. This application claims the priority benefit of Japanese Patent Application No. 2022-123581 filed on Aug. 2, 2022, the entire content of which is incorporated herein by reference.

BACKGROUND ART

Technology has been developed to change settings of an in-vehicle network configuration. For example, Patent Literature 1 (International Publication No. WO2020/179124) discloses the following technology. That is, a management device includes: a detection unit that detects addition of a function unit to a network including one or a plurality of in-vehicle function units; a generation unit that acquires function unit information of a new function unit that is the function unit the addition of which has been detected by the detection unit, and function unit information of the in-vehicle function unit, and generates, based on the respective pieces of function unit information acquired, configuration information of a new network that is the network in which the new function unit is further included; and an acquisition unit that acquires, from a database in a storage device, feasibility information indicating feasibility of the new network and corresponding to the configuration information generated by the generation unit.

CITATION LIST

Patent Literature

PATENT LITERATURE 1: WO2020/179124

SUMMARY OF THE INVENTION

A management device according to the present disclosure includes: a detection unit that detects addition of a function unit to a network including one or a plurality of in-vehicle function units; an acquisition unit that acquires function unit information of each in-vehicle function unit, and if target information, which is function unit information of a new function unit that is the function unit the addition of which has been detected by the detection unit, cannot be acquired from the new function unit, acquires the target information by transmitting a lacking information notification for requesting a user to provide the target information; and a generation unit that, based on each function unit information acquired by the acquisition unit, generates configuration information of a new network which is the network further including the new function unit.

One mode of the present disclosure can be realized as a semiconductor integrated circuit that realizes a part or the entirety of the management device, or can be realized as a system including the management device.

BRIEF DESCRIPTION OF DRAWINGS

FIG. 10 shows an example of a success/failure database stored in a storage device in a communication system according to an embodiment of the present disclosure.

FIG. 11 shows an example of a setting database stored in a storage device in a communication system according to an embodiment of the present disclosure.

DETAILED DESCRIPTION

Figure 1:
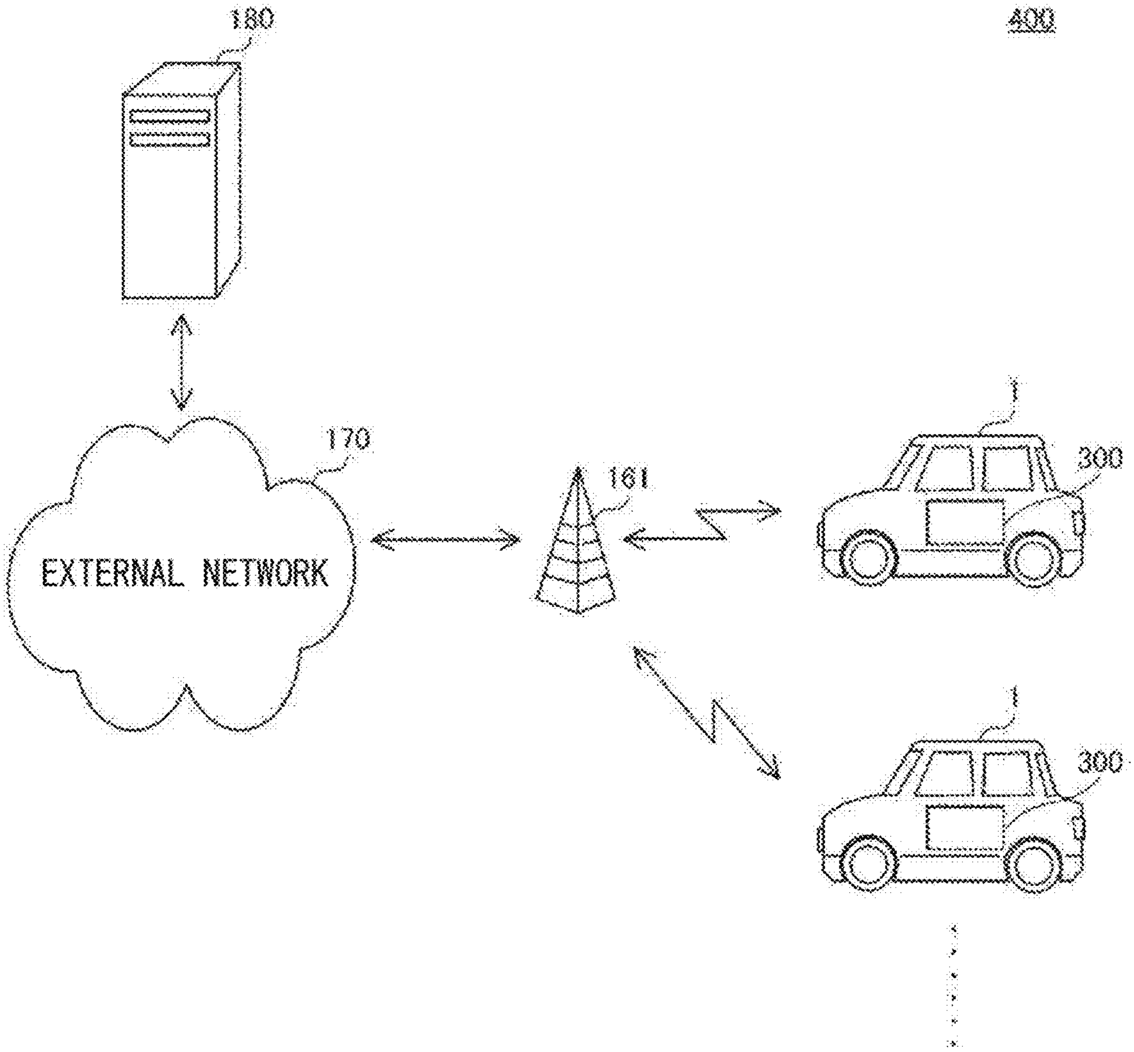
FIG. 1 shows a configuration of a communication system according to an embodiment of the present disclosure.

Problem to be Solved by the Present Disclosure

In the technology described in Patent Literature 1, the new function unit has a function of transmitting the function unit information. However, for example, if an in-vehicle ECU (Electronic Control Unit) added to the in-vehicle network does not have that function, it is difficult for the management device to generate configuration information of a new network.

The present disclosure has been made to solve the above problem, and an object of the present disclosure is to provide a management device, a vehicle communication management method, and a vehicle communication management program capable of reliably constructing a network of a new configuration including an in-vehicle function unit.

Effect of Present Disclosure

According to the present disclosure, it is possible to more reliably construct a network of a new configuration including an in-vehicle function unit.

Summary of Embodiments of the Present Disclosure

First, contents of embodiments of the present disclosure are listed and described.

(1) A management device according to an embodiment of the present disclosure includes: a detection unit that detects addition of a function unit to a network including one or a plurality of in-vehicle function units; an acquisition unit that acquires function unit information of each in-vehicle function unit, and if target information, which is function unit information of a new function unit that is the function unit the addition of which has been detected by the detection unit, cannot be acquired from the new function unit, acquires the target information by transmitting a lacking information notification for requesting a user to provide the target information; and a generation unit that, based on each function unit information acquired by the acquisition unit, generates configuration information of a new network which is the network further including the new function unit.

According to the above configuration, even when the new function unit added to the network does not have a function of transmitting the function unit information, it is possible to supplement the function unit information by using the lacking information notification, and generate the configuration information of the new network. Therefore, it is possible to more (2) In the above (1), the acquisition unit may transmit the lacking information notification including an addition position of the new function unit to the network.

According to the above configuration, when a plurality of unknown devices have been added as new function units to the network, the user can easily identify the respective devices, thereby improving convenience of the user when inputting the target information.

(3) In the above 1 or 2, the acquisition unit may store therein history information in which the new function unit, the target information of which has been acquired by transmitting the lacking information notification, is associated with the target information, and when another new function unit has been newly detected by the detection unit, the acquisition unit, based on the history information, may acquire the function unit information of the in-vehicle function unit, the target information of which has been acquired by transmitting the lacking information notification.

According to the above configuration, it is possible to recognize the in-vehicle function unit, the target information of which was acquired in the past, as a new function unit. Therefore, in the case where a plurality of function units have been added to the network at different times, it is possible to more reliably generate the configuration information of the new network.

(4) In any of the above (1) to (3), the management device may further include a setting processing unit that acquires, from a database in a storage device, feasibility information indicating feasibility of the new network and corresponding to the configuration information generated by the generation unit.

According to the above configuration, it is possible to construct the new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which may be caused by addition of a new function unit to the network.

(5) A vehicle communication management method according to an embodiment of the present disclosure is a method used in a management device, and includes: a step that detects addition of a function unit to a network including one or a plurality of in-vehicle function units; a step that acquires function unit information of each in-vehicle function unit; a step that, if target information, which is function unit information of a new function unit that is the function unit the addition of which has been detected, cannot be acquired from the new function unit, acquires the target information by transmitting a lacking information notification for requesting a user to provide the target information; and a step that, based on each function unit information acquired, generates configuration information of a new network which is the network further including the new function unit.

According to the above configuration, even when the new function unit added to the network does not have a function of transmitting function unit information, it is possible to supplement the function unit information by using the lacking information notification, and generate the configuration information of the new network. Therefore, it is possible to more (6) A vehicle communication management program according to the embodiment of the present disclosure is a program used in a management device, and causes a computer to function as: a detection unit that detects addition of a function unit to a network including one or a plurality of in-vehicle function units; an acquisition unit that acquires function unit information of each in-vehicle function unit, and if target information, which is function unit information of a new function unit that is the function unit the addition of which has been detected by the detection unit, cannot be acquired from the new function unit, acquire the target information by transmitting a lacking information notification for requesting a user to provide the target information; and a generation unit that, based on each function unit information acquired by the acquisition unit, generates configuration information of a new network which is the network further including the new function unit.

According to the above configuration, even when the new function unit added to the network does not have a function of transmitting the function unit information, it is possible to supplement the function unit information by using the lacking information notification, and generate the configuration information of the new network. Therefore, it is possible to more reliably construct a network of a new configuration including in-vehicle function units.

Details of Embodiments of the Present Disclosure

Hereinafter, embodiments of the present disclosure will be described with reference to the drawings. In the drawings, the same or corresponding parts are denoted by the same reference signs, and description thereof is not repeated. At least some parts of the embodiments described below may be combined together as desired.

Communication System

FIG. 1 shows a configuration of a communication system according to an embodiment of the present disclosure.

With reference to FIG. 1, a communication system 400 includes a server 180 and one or a plurality of vehicle communication systems 300. Each vehicle communication system 300 is installed in a vehicle 1.

Figure 2:
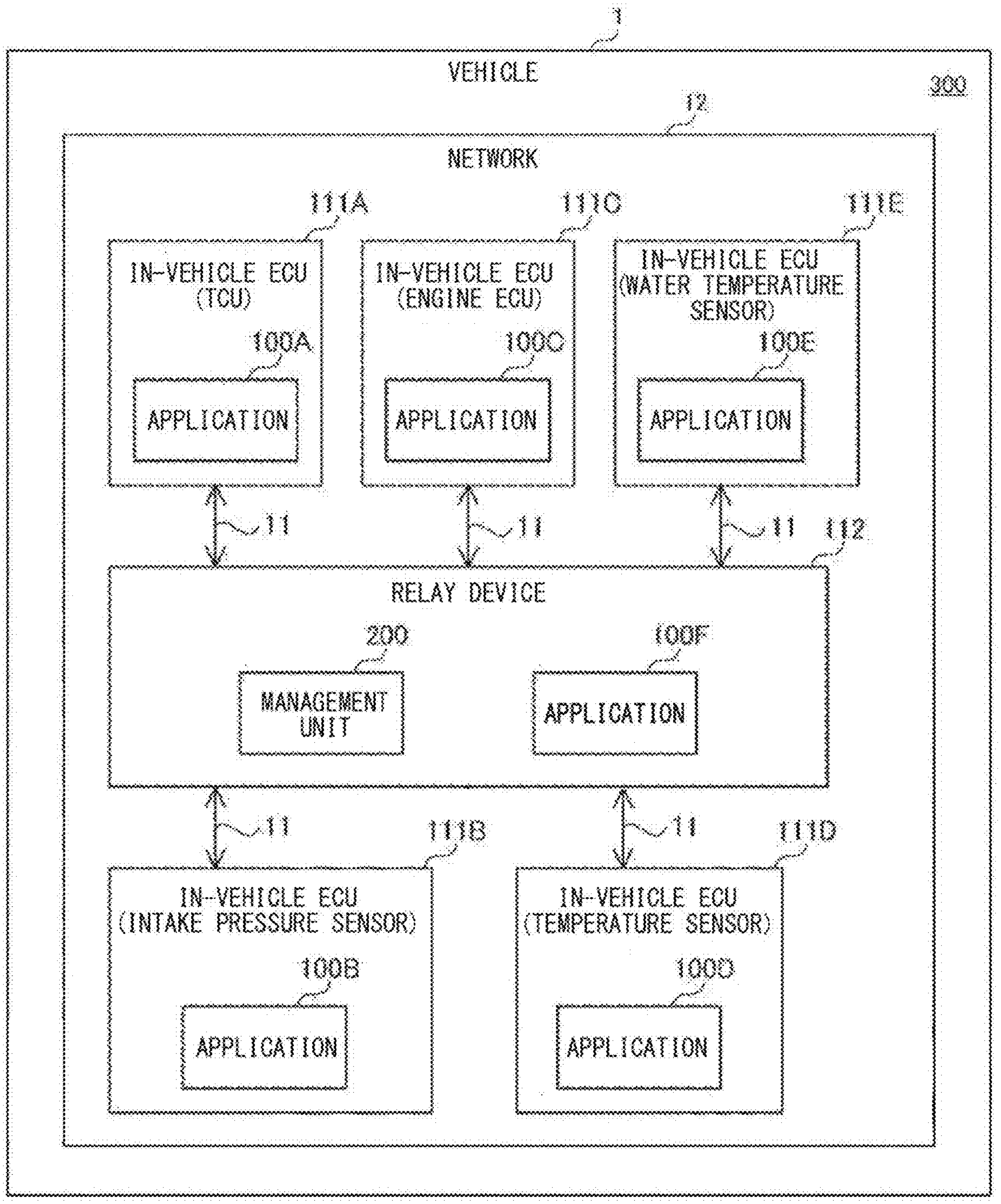
FIG. 2 shows an example of a configuration of a vehicle communication system according to an embodiment of the present disclosure.

FIG. 2 shows an example of a configuration of a vehicle communication system according to an embodiment of the present disclosure.

With reference to FIG. 2, the vehicle communication system 300 includes one or a plurality of in-vehicle ECUs (Electronic Control Units) 111, and a relay device 112. Specifically, the vehicle communication system 300 includes in-vehicle ECUs 111A, 111B, 111C, 111D, 111E as the in-vehicle ECUs 111. The relay device 112 includes a management unit 200.

Each of the in-vehicle ECUs 111A, 111B, 111C, 111D, 111E and the relay device 112 includes an application 100.

More specifically, as the application 100, the in-vehicle ECU 111A includes an application 100A, the in-vehicle ECU 111B includes an application 100B, the in-vehicle ECU 111C includes an application 100C, the in-vehicle ECU 111D includes an application 100D, the in-vehicle ECU 111E includes an application 100E, and the relay device 112 includes an application 100F.

The in-vehicle ECUs 111A, 111B, 111C, 111D, 111E and the relay device 112 construct a network 12.

Of function units, i.e., objects, in the network 12, the in-vehicle ECUs 111 and the applications 100 are examples of in-vehicle function units that are function units installed in the vehicle 1. The relay device 112 is an example of a management device.

The vehicle communication system 300 is not limited to a configuration including five in-vehicle ECUs 111, and may be of a configuration including one, two, three, four, six or more in-vehicles ECUs 111. Moreover, one in-vehicle ECU 111 is not limited to a configuration provided with one application 100, and may be of a configuration provided with two or more applications 100.

The vehicle communication system 300 is not limited to a configuration including one relay device 112, and may be of a configuration including a plurality of relay devices 112. Moreover, one relay device 112 is not limited to a configuration provided with one application 100, and may be of a configuration provided with two or more applications 100.

In addition, the network 12 may include, as a function unit, i.e., an object, an external device placed outside the vehicle 1 and an application provided in this external device.

Examples of the in-vehicle ECUs 111 include a TCU (Telematics Communication Unit), an automated driving ECU, an engine ECU, a sensor, a navigation device, a human/machine interface, and a camera.

In this example, the in-vehicle ECUs 111A, 111B, 111C, 111D, and 111E are a TCU, an intake pressure sensor, an engine ECU, a temperature sensor, and a water temperature sensor, respectively.

Hereinafter, the in-vehicle ECUs 111A, 111B, 111C, 111D, and 111E are also referred to as a TCU 111A, an intake pressure sensor 111B, an engine ECU 111C, a temperature sensor 111D, and a water temperature sensor 111E, respectively.

In the network 12, the in-vehicle ECUs 111A, 111B, 111C, 111D, 111E are connected to the relay device 112 via Ethernet (registered trademark) cables 11.

The relay device 112 is, for example, a gateway device, and is capable of relaying data between the plurality of in-vehicle ECUs 111 connected thereto.

The relay device 112 performs an Ethernet frame relaying process according to a communication standard of Ethernet. Specifically, the relay device 112 relays, for example, an Ethernet frame that is exchanged between the in-vehicle ECUs 111. An IP packet is stored in the Ethernet frame.

In the vehicle communication system 300, the Ethernet frame relaying is not limited to a configuration in which the relaying is performed according to the communication standard of Ethernet. For example, data may be relayed according to any communication standard such as CAN (Controller Area Network) (registered trademark), CAN FD (CAN with Flexible Data Rate), FlexRay (registered trademark), MOST (Media Oriented Systems Transport) (registered trademark), and LIN (Local Interconnect Network).

With reference to FIG. 1 and FIG. 2, the TCU 111A is capable of communicating with the server 180. Specifically, the TCU 111A is capable of communicating with the server 180 via a wireless base station device 161 by using an IP packet, for example.

More specifically, the TCU 111A is capable of wirelessly communicating with the wireless base station device 161 according to a communication standard such as LTE (Long Term Evolution) or 5G.

Specifically, upon receiving an IP packet from the server 180 via an external network 170 such as the Internet, the wireless base station device 161 includes the received IP packet in a wireless signal, and transmits the wireless signal to the TCU 111A.

Upon receiving, from the wireless base station device 161, the wireless signal including the IP packet from the server 180, for example, the TCU 111A acquires the IP packet from the received wireless signal, stores the acquired IP packet in an Ethernet frame, and transmits the Ethernet frame to the relay device 112.

Further, upon receiving the Ethernet frame from the relay device 112, the TCU 111A acquires an IP packet from the received Ethernet frame, includes the acquired IP packet in a wireless signal, and transmits the wireless signal to the wireless base station device 161.

Upon receiving the wireless signal from the TCU 111A, the wireless base station device 161 acquires the IP packet from the received wireless signal, and transmits the acquired IP packet to the server 180 via the external network 170.

The intake pressure sensor 111B is capable of communicating with another in-vehicle ECU 111 via the relay device 112, and, for example, periodically measures the intake pressure of the engine in the vehicle 1.

The engine ECU 111C is capable of communicating with another in-vehicle ECU 111 via the relay device 112, and, for example, controls the engine in the vehicle 1.

More specifically, the engine ECU 111C acquires information indicating, for example, the rotation speed of the engine, the vehicle speed of the vehicle 1, the shaft torque of the engine, the state of the transmission, the state of the throttle valve, measurement values of the sensors, and the like, and controls the engine based on the acquired information.

The engine ECU 111C is capable of transmitting a part or the entirety of the acquired information to the relay device 112, in response to a request from the relay device 112, for example.

The temperature sensor 111D is capable of communicating with another in-vehicle ECU 111 via the relay device 112, and, for example, periodically measures the ambient temperature of the vehicle 1.

The water temperature sensor 111E is capable of communicating with another in-vehicle ECU 111 via the relay device 112, and, for example, periodically measures the temperature of coolant circulating inside the engine in the vehicle 1.

Each application 100 performs, for example, an application layer process to perform a predetermined process in the in-vehicle ECU 111 or the relay device 112 in which the application 100 is installed. For example, the application 100D in the temperature sensor 111D generates, in a predetermined cycle, temperature information indicating the ambient temperature of the vehicle 1.

Figure 3:
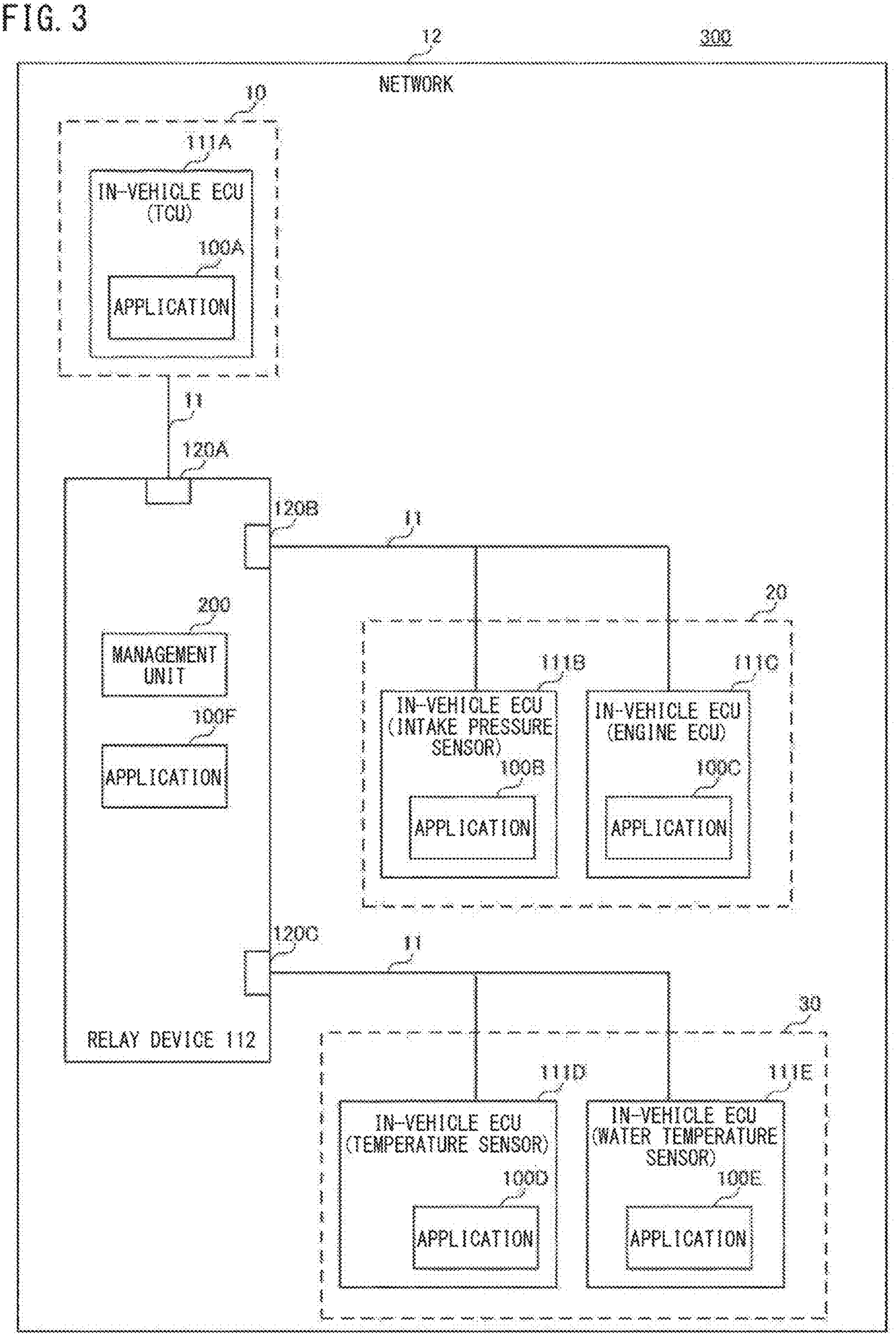
FIG. 3 shows an example of a network configuration in a vehicle communication system according to an embodiment of the present disclosure.

FIG. 3 shows an example of a network configuration in a vehicle communication system according to an embodiment of the present disclosure.

With reference to FIG. 3, the relay device 112 includes communication ports 120A, 120B, 120C. Each of the communication ports 120A, 120B, 120C is also referred to as a communication port 120. The communication ports 120 are terminals connectable with Ethernet cables 11, for example.

In the example shown in FIG. 3, the TCU 111A is connected to the communication port 120A, the intake pressure sensor 111B and the engine ECU 111C are connected to the communication port 120B, and the temperature sensor 111D and the water temperature sensor 111E are connected to the communication port 120C.

Additionally, in the network 12, the TCU 111A belongs to a VLAN (Virtual Local Area Network) 10. The intake pressure sensor 111B and the engine ECU 111C belong to a VLAN 20 different from the VLAN 10. The temperature sensor 111D and the water temperature 111E belong to a VLAN 30 different from the VLAN 10 and the VLAN 20.

The relay device 112 performs, for example, relaying of an Ethernet frame between the in-vehicle ECUs 111 that belong to the same VLAN. Specifically, based on a transmission source MAC (Media Access Control) address and a transmission destination MAC address included in a received Ethernet frame, the relay device 112 transmits the Ethernet frame to a destination in-vehicle ECU 111.

Moreover, the relay device 112 performs, for example, relaying of an IP packet between the in-vehicle ECUs 111 that belong to different VLANs. Specifically, the relay device 112 acquires an IP packet from the received Ethernet frame, and transmits the IP packet to a destination in-vehicle ECU 111, based on a destination IP address of the acquired IP packet.

Management Unit

Figure 4:
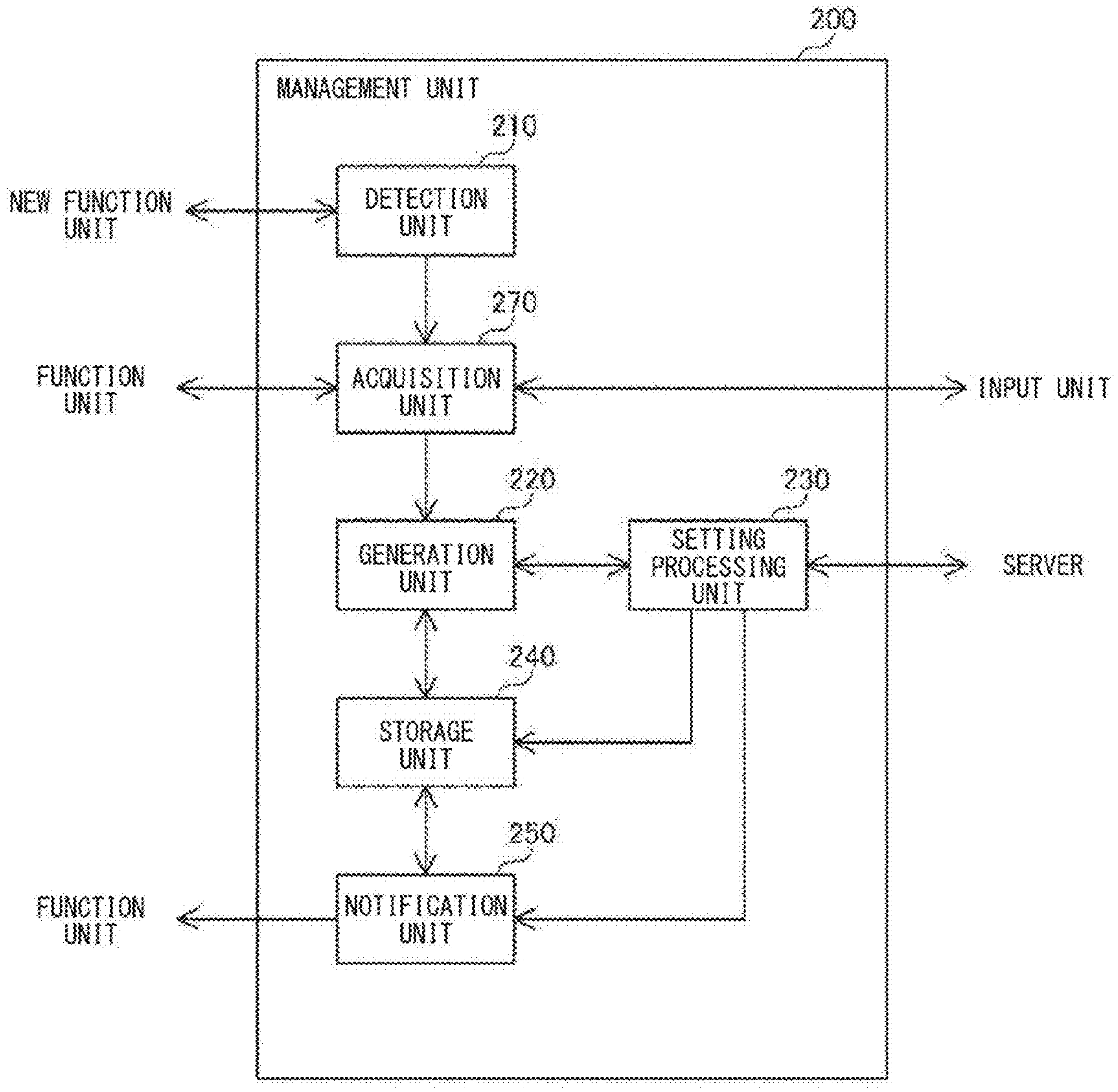
FIG. 4 shows a configuration of a management unit according to an embodiment of the present disclosure.

FIG. 4 shows a configuration of a management unit according to an embodiment of the present disclosure.

With reference to FIG. 4, the management unit 200 includes a detection unit 210, a generation unit 220, a setting processing unit 230, a storage unit 240, a notification unit 250, and an acquisition unit 270. A part or all of the detection unit 210, the generation unit 220, the setting processing unit 230, the notification unit 250, and the acquisition unit 270 are implemented by, for example, processing circuitry including one or a plurality of processors. The storage unit 240 is, for example, a non-volatile memory included in the processing circuitry.

Detection Unit

The detection unit 210 detects a new function unit that is a function unit to be newly added to the network 12. That is, the detection unit 210 detects addition of a new function unit to the network 12. More specifically, the detection unit 210 detects additions of an in-vehicle ECU 111, an external device, an application 100, and the like, to the network 12. As one example, the detection unit 210 detects, as a new function unit, an application 100 of an in-vehicle ECU 111 to be newly added to the network 12.

For example, the new function unit transmits, to the detection unit 210, connection request information for requesting communication connection in the network 12.

Upon receiving the connection request information, the detection unit 210 detects the new function unit as the transmission source of the connection request information.

The detection unit 210 may, for example, periodically broadcast a search message for detecting a new function unit. In this case, the new function unit receives the search message, and transmits the connection request information as a response to the received search message.

Hereinafter, the network 12 including a new function unit is also referred to as a new network, the network 12 before addition of a new function unit is also referred to as an existing network, and a function unit included in the existing network is also referred to as an existing function unit. An in-vehicle ECU 111 included in the existing network is an example of an existing function unit.

Figure 5:
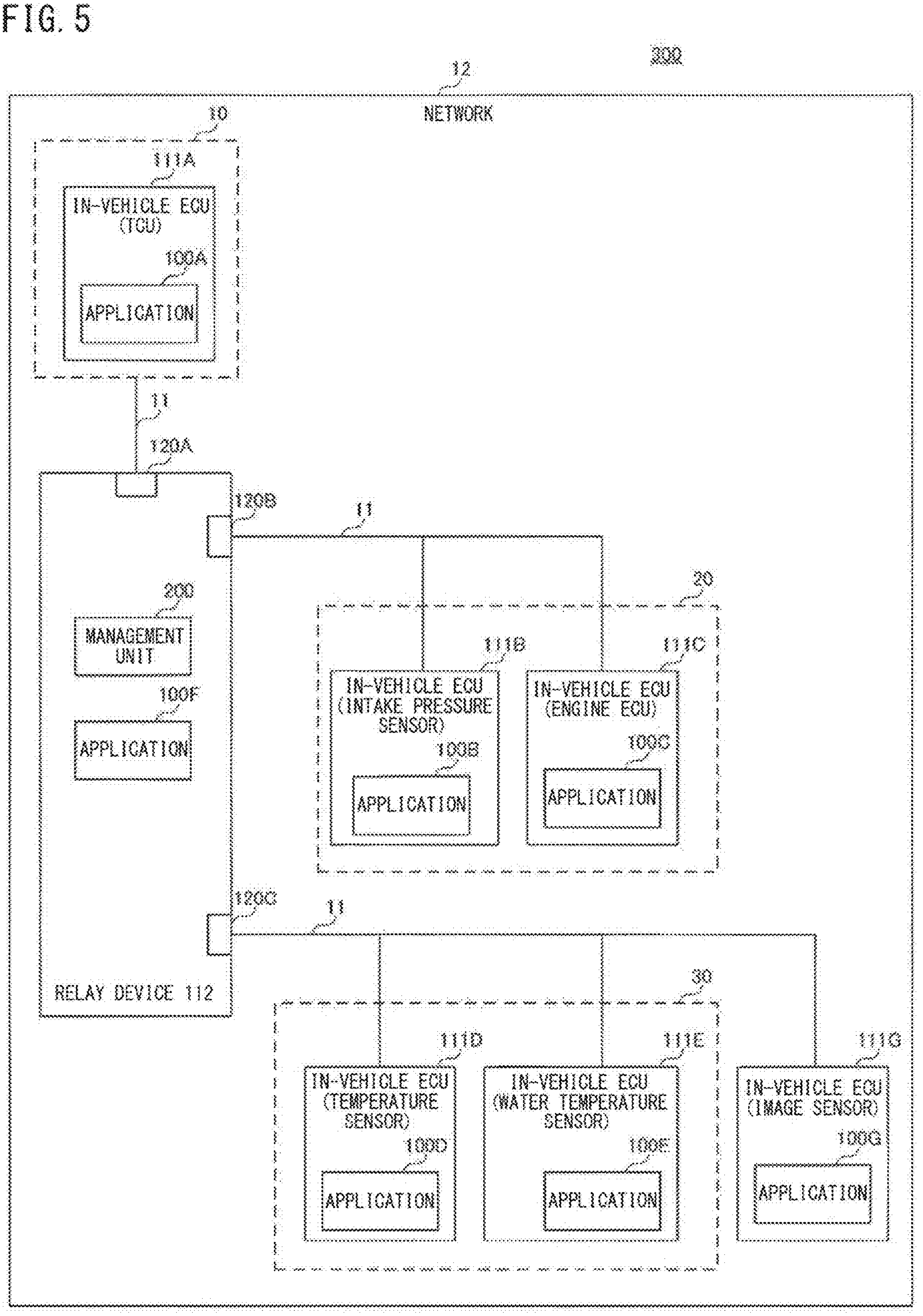
FIG. 5 shows an example of a configuration of a new network in a vehicle communication system according to an embodiment of the present disclosure.

FIG. 5 shows an example of a configuration of a new network in a vehicle communication system according to an embodiment of the present disclosure.

With reference to FIG. 5, it is assumed that an in-vehicle ECU 111G is newly added to the network 12. In this example, the in-vehicle ECU 111G is an image sensor. Hereinafter, the in-vehicle ECU 111G is also referred to as an image sensor 111G. The image sensor 111G includes an application 100G, which is a new function unit.

When the image sensor 111G receives supply of power and is connected to the communication port 120C in the relay device 112 via the Ethernet cable 11, for example, the image sensor 111G transmits, to the detection unit 210, connection request information for requesting communication connection in the network 12.

More specifically, the application 100G in the image sensor 111G generates an Ethernet frame including the connection request information, its own ID, and the MAC address of the relay device 112 as a transmission destination MAC address, and transmits the generated Ethernet frame to the relay device 112.

Upon receiving the Ethernet frame transmitted from the application 100G, the detection unit 210 in the relay device 112 performs an authentication process for the application 100G by using the ID and the like included in the received Ethernet frame.

When the authentication of the application 100G has been successful, the detection unit 210 generates an Ethernet frame including authentication success information indicating that the authentication has been successful, and the MAC address of the image sensor 111G as a transmission destination MAC address, and transmits the generated Ethernet frame to the image sensor 111G.

Figure 6:
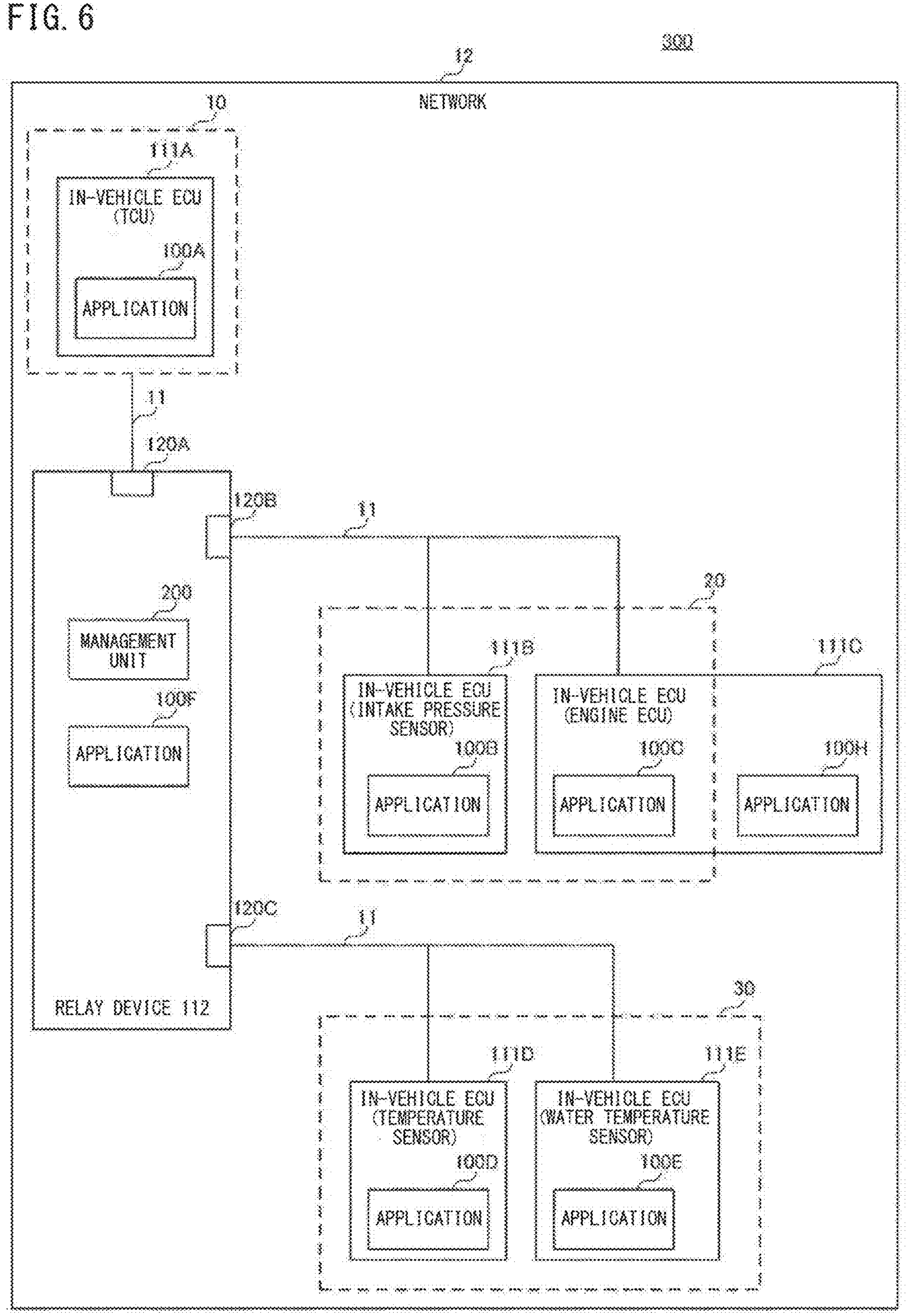
FIG. 6 shows another example of a configuration of a new network in a vehicle communication system according to an embodiment of the present disclosure.

FIG. 6 shows another example of a configuration of a new network in a vehicle communication system according to an embodiment of the present disclosure.

A new function unit to be detected by the detection unit 210 is not limited to an application 100 included in an in-vehicle ECU 111 to be newly connected to the relay device 112. For example, the detection unit 210 may detect, as a new function unit, an application 100 to be newly installed in an in-vehicle ECU 111 in the existing network.

With reference to FIG. 6, it is assumed that, in the network 12, an application 100H is newly installed as a new function unit in the engine ECU 111C that is an existing function unit.

When the application 100H has been installed in the engine ECU 111C, the application 100H generates an Ethernet frame including connection request information, its own ID, and the MAC address of the relay device 112 as a transmission destination MAC address, and transmits the generated Ethernet frame to the relay device 112.

Upon receiving the Ethernet frame transmitted from the application 100H, the detection unit 210 in the relay device 112 performs an authentication process for the application 100H by using the ID and the like included in the received Ethernet frame.

When the authentication of the application 100H has been successful, the detection unit 210 generates an Ethernet frame including authentication success information indicating that the authentication has been successful, and the MAC address of the engine ECU 111C as a transmission destination MAC address, and transmits the generated Ethernet frame to the engine ECU 111C.

Figure 7:
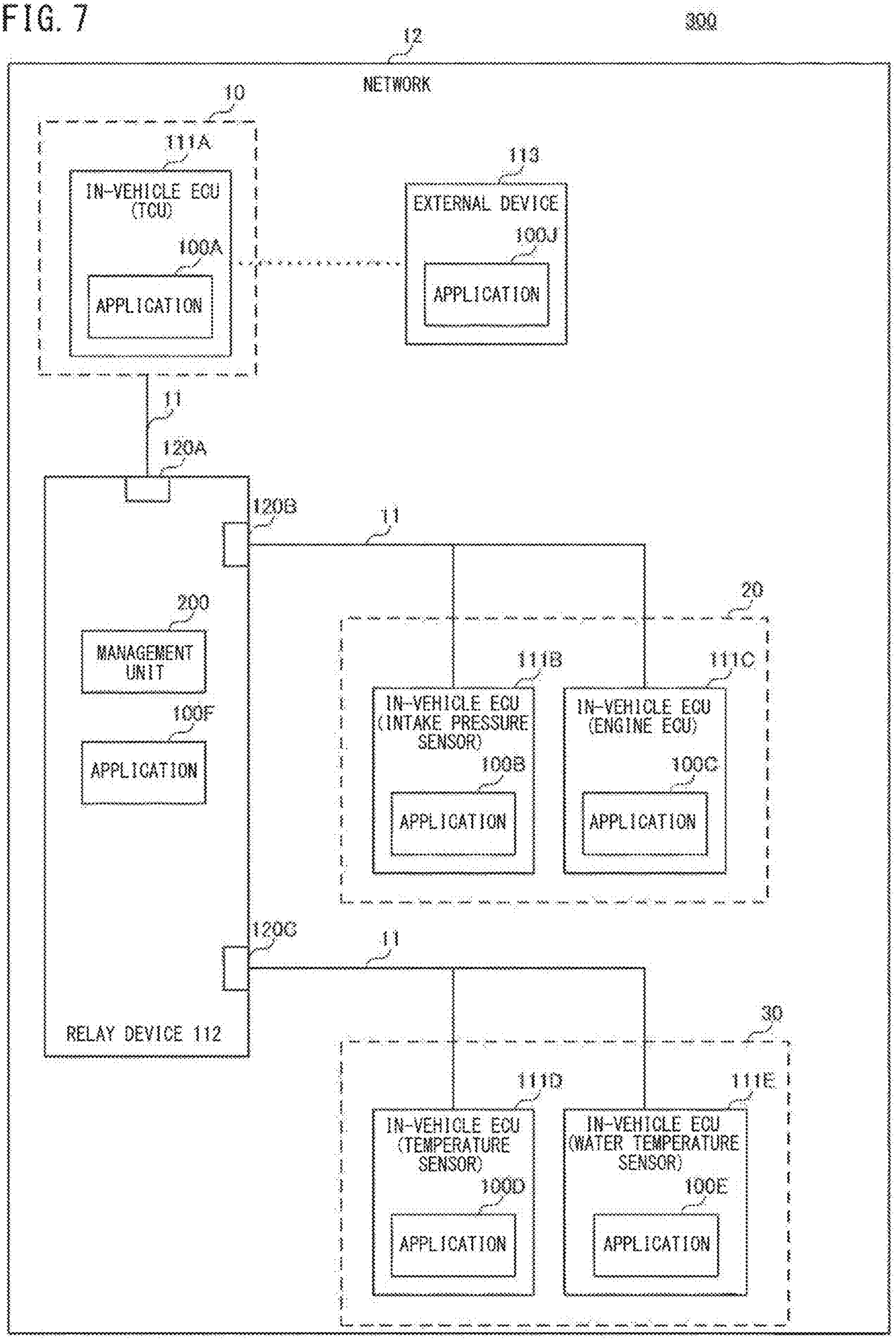
FIG. 7 shows another example of a configuration of a new network in a vehicle communication system according to an embodiment of the present disclosure.

FIG. 7 shows another example of a configuration of a new network in a vehicle communication system according to an embodiment of the present disclosure.

A new function unit to be detected by the detection unit 210 is not limited to an application 100 included in an in-vehicle ECU 111 to be newly connected to the relay device 112 or an application 100 to be installed in an in-vehicle ECU 111, as described above. For example, the detection unit 210 may detect, as a new function unit, an application 100 included in an external device 113 to be added to the network 12 outside the vehicle 1.

With reference to FIG. 7, it is assumed that an external device 113 is newly added to the network 12. The external device 113 is a device placed outside the vehicle 1. The external device 113 includes an application 100J as a new function unit.

The external device 113 is capable of communicating with the TCU 111A. More specifically, the external device 113 is capable of communicating with the TCU 111A via the wireless base station device 161 by using an IP packet, for example.

The external device 113 transmits connection request information for requesting communication connection in the network 12, to the detection unit 210 via the TCU 111A.

More specifically, the application 100J in the external device 113 transmits an IP packet including the connection request information, its own ID, and the MAC address of the relay device 112, to the wireless base station device 161 via the external network 170.

Upon receiving the IP packet from the external device 113 via the external network 170, the wireless base station device 161 includes the received IP packet in a wireless signal, and transmits the wireless signal to the TCU 111A.

Upon receiving, from the wireless base station device 161, the wireless signal including the IP packet from the application 100J, the TCU 111A acquires the IP packet from the received wireless signal, generates an Ethernet frame including the acquired IP packet and the MAC address of the relay device 112 as a transmission destination MAC address, and transmits the generated Ethernet frame to the relay device 112.

Upon receiving the Ethernet frame from the TCU 111A, the detection unit 210 in the relay device 112 performs an authentication process for the application 100J by using the ID and the like included in the IP packet stored in the received Ethernet frame.

When the authentication of the application 100J has been successful, the detection unit 210 generates an Ethernet frame including authentication success information indicating that the authentication has been successful, and the MAC address of the external device 113 as a transmission destination MAC address, and transmits the generated Ethernet frame to the TCU 111A.

Upon receiving the Ethernet frame from the detection unit 210, the TCU 111A acquires the IP packet from the received Ethernet frame, includes the acquired IP packet in a wireless signal, and transmits the wireless signal to the external device 113 via the wireless base station device 161.

When authentication of the new function unit has been successful as described above, the detection unit 210 outputs detection information indicating the ID of the new function unit, the port number of the corresponding communication port 120, and the like to the acquisition unit 270.

If the vehicle communication system 300 includes a plurality of relay devices 112 and an in-vehicle ECU 111 is newly connected to a relay device 112 that does not include a management unit 200, the configuration may be such that, for example, the relay device 112 detects the connection of the in-vehicle ECU 111 by link-up of the Ethernet, LLDP (Link Layer Discovery Protocol), or the like, and transmits the detection information about the new function unit to the management unit 200 in another relay device 112.

Acquisition Unit

The acquisition unit 270 acquires the function unit information of an existing function unit and the function unit information of a new function unit. More specifically, upon receiving the detection information from the detection unit 210, the acquisition unit 270 starts an acquisition process of acquiring the function unit information of the existing function unit and the function unit information of the new function unit. The acquisition unit 270 acquires the function unit information of the new function unit indicated by the detection information, acquires the function unit information of the existing function unit, and outputs these pieces of information to the generation unit 220.

For example, the acquisition unit 270 acquires, as function unit information, information that allows recognition of topologies of hardware devices such as the in-vehicle ECU 111, the relay device 112, and the external device 113 in the new network. Moreover, for example, the acquisition unit 270 acquires, as function unit information, information that allows recognition of restriction regarding allocation of applications 100 to the hardware devices in the new network. Moreover, for example, the acquisition unit 270 acquires information that allows recognition of restriction on the communication method between the applications 100.

For example, the acquisition unit 270 acquires, as the information that allows recognition of the topologies of the hardware devices, vehicle information indicating the manufacturer and the model of the vehicle 1 in which the in-vehicle ECU 111 and the relay device 112 are installed, additional option information indicating an additional option installed in the vehicle 1, an in-vehicle device ID as an identifier indicating the manufacturer, the serial number, and the like of the in-vehicle ECU 111, the port number of the communication port for connection between the hardware devices, and information about the bandwidth of the communication path between the hardware devices.

The acquisition unit 270 acquires, for example, the IDs of the applications 100, as the information that allows recognition of restriction regarding allocation of the applications 100 to the hardware devices.

The acquisition unit 270 acquires, as the information that allows recognition of restriction on the communication method between the applications 100, information indicating the communication standard used for communication between the applications 100, such as Ethernet and CAN.

For example, the acquisition unit 270 transmits an information request notification indicating a type of function unit information to be transmitted among the types of function unit information described above, to the existing function unit and the new function unit.

As a response to the information request notification received from the acquisition unit 270, the existing function unit and the new function unit each transmit, for example, its own function unit information of the type designated in the information request notification, to the acquisition unit 270.

When the acquisition unit 270 cannot acquire the function unit information (hereinafter also referred to as "target information") of the new function unit that is a function unit the addition of which has been detected by the detection unit 210, the acquisition unit 270 acquires the target information by transmitting a lacking information notification for requesting the user to provide the target information.

More specifically, when the target information does not arrive from the new function unit even though a predetermined time has elapsed from transmission of the information request notification, the acquisition unit 270 determines that the new function unit does not have a function of transmitting the function unit information, and transmits the lacking information notification for requesting the target information to the input unit 290. The input unit 290 is, for example, IVI (In-Vehicle Infotainment), and one example thereof is an in-vehicle ECU 111 that is a navigation device.

The acquisition unit 270 may transmit the lacking information notification indicating a designated type in the information request notification.

In addition, the acquisition unit 270 may transmit the lacking information notification including an addition position, in the network 12, where the new function unit is added. The addition position is, for example, a port number of a communication port 120, of the relay device 112, to which an in-vehicle ECU 111 is newly connected.

A navigation device that is the input unit 290 receives the lacking information notification from the acquisition unit 270, and performs a process of displaying, on a screen, contents that urge input of the target information. For example, the navigation device displays, on the screen, the type, the addition position or the like indicated by the lacking information notification.

The acquisition unit 270 acquires the target information that is based on the content of an operation performed by the user in response to the lacking information notification.

More specifically, for example, the user, who has newly connected an in-vehicle ECU 111 to the network 12, checks the screen, and performs an operation of inputting the target information to the navigation device.

The navigation device receives the input operation of the user, and transmits the target information that is based on the content of the operation to the relay device 112.

In the above configuration, it is possible to acquire more accurate target information by using the content of the input from the user who has added the function unit, for example.

The input unit 290 is not limited to a navigation device, and may be a mobile terminal of the user in the vehicle 1, or a device outside the vehicle 1, such as the server 180.

Modification

Figure 8:
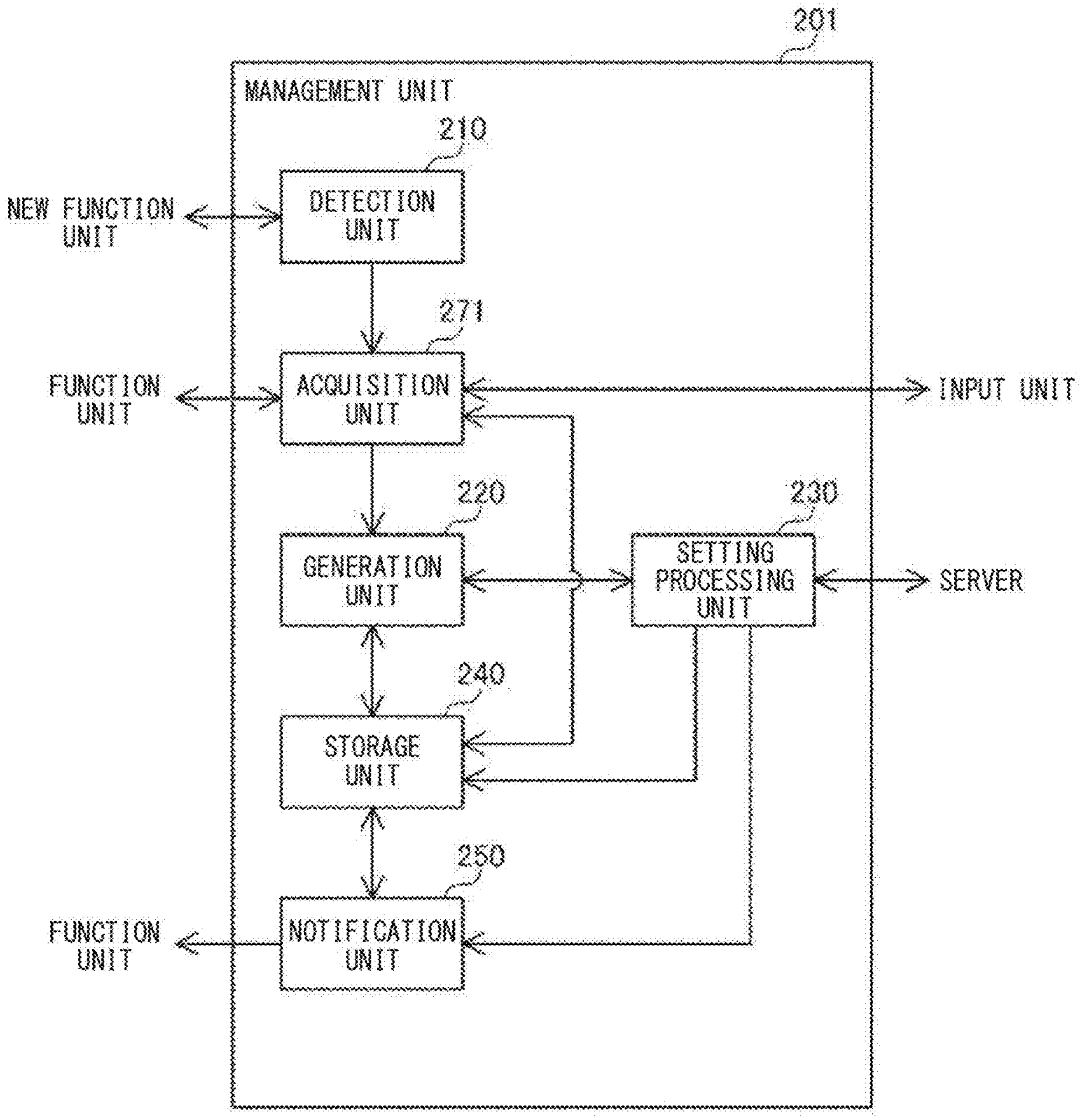
FIG. 8 shows a configuration of a modification of the management unit according to an embodiment of the present disclosure.

FIG. 8 shows a configuration of a modification of the management unit according to an embodiment of the present disclosure. The operation of the modification of the management unit is identical to that of the management unit 200 shown in FIG. 4 except for the content described below.

With reference to FIG. 8, in comparison with the management unit 200 shown in FIG. 4, the management unit 201 includes an acquisition unit 271 instead of the acquisition unit 270.

The acquisition unit 271 stores, in the storage unit 240, history information in which a new function unit, the target information of which has been acquired by transmitting a lacking information notification, is associated with the target information. When another new function unit has been newly detected by the detection unit 210, the acquisition unit 271 acquires, based on the history information, the target information of the in-vehicle function unit that was acquired through the transmission of the lacking information notification, i.e., the target information of a past new function unit.

More specifically, for example, when authentication of a new function unit A has been successful, the detection unit 210 outputs, to the acquisition unit 271, detection information indicating the ID of the new function unit A, and a port number of a communication port 120, of the relay device 112, to which the new function unit A is newly connected.

When the acquisition unit 271 has acquired the target information of the new function unit A through the transmission of the lacking information notification, the acquisition unit 271 registers, in the history information in the storage unit 240, the ID of the new function unit A corresponding to the target information, and the port number of the communication port 120 to which the new function unit A is newly connected, in association with the target information. In the history information, the target information itself may be registered, or identification information of the target information may be registered.

Thereafter, when another new function unit B has been added to the network 12, the acquisition unit 271 receives, from the detection unit 210, detection information indicating the ID of the new function unit B, and a port number of a communication port 120, of the relay device 112, to which the new function unit B is newly connected, and refers to the history information in the storage unit 240. Then, the acquisition unit 271 acquires the already-registered target information of the new function unit A, as the function unit information of the existing function unit, and outputs the target information to the generation unit 220.

In a configuration where the vehicle communication system 300 includes a plurality of relay devices 112, when a new function unit A has been newly connected to a relay device 112 including no management unit 201, this relay device 112 transmits, to a relay device 112 including the management unit 201, detection information indicating the ID of the new function unit A, the port number of the communication port 120, of the relay device 112, to which the new function unit A is newly connected, and the ID of the relay device 112.

When the acquisition unit 271 has acquired the target information of the new function unit A through the transmission of the lacking information notification, the acquisition unit 271 registers, in the history information in the storage unit 240, the ID of the new function unit A corresponding to the target information, the port number of the communication port 120 to which the new function unit A is newly added, and the ID of the relay device 112, in association with the target information.

In addition, when the new function unit B has been added to the network 12, a relay device 112 including no management unit 201 may transmit detection information about the new function unit A and the new function unit B. In this case as well, the acquisition unit 271 can acquire the target information of the new function unit A from the history information by referring to the port number of the communication port 120 of the relay device 112, and the ID of the relay device 112.

Generation Unit

The generation unit 220 generates configuration information of a new network, based on the function unit information of the existing function unit and the function unit information of the new function unit which are acquired by the acquisition unit 270. The generation unit 220 generates configuration information of a new network, based on the respective pieces of function unit information received from the acquisition unit 270, and outputs the configuration information to the setting processing unit 230.

For example, the generation unit 220 generates, as configuration information, information capable of specifying the function units in the vehicle 1 and the new network. Here, as one example, the generation unit 220 generates configuration information indicating a combination of vehicle information, the ID of an application 100 in the existing network, and the ID of an application 100 to be added.

The acquisition unit 270 may have a configuration that acquires the configuration information of the existing network as the function unit information of each existing function unit, and outputs the configuration information to the generation unit 220.

More specifically, the storage unit 240 stores therein the configuration information of the existing network in some cases.

The acquisition unit 270 refers to the storage unit 240, and if the configuration information of the existing network is registered in the storage unit 240, acquires the configuration information from the storage unit 240. In this case, the acquisition unit 270 transmits an information request notification to the new function unit, but does not transmit the same to the existing function unit.

The generation unit 220 generates the configuration information of the new network, based on the function unit information of the new function unit and the configuration information of the existing network which are received from the acquisition unit 270. Specifically, the generation unit 220 modifies the configuration information of the existing network acquired from the storage unit 240, by using the function unit information of the new function unit, thereby generating the configuration information of the new network. The generation unit 220 updates the configuration information stored in the storage unit 240 to the new configuration information generated.

Setting Processing Unit

The setting processing unit 230 acquires, from a database in the storage device, feasibility information indicating feasibility of the new network and corresponding to the configuration information generated by the generation unit 220.

More specifically, the setting processing unit 230 acquires, as the feasibility information, success/failure information indicating whether or not the new network is successful, and setting information indicating the setting content for performing communication in the new network, for example.

Figure 9:
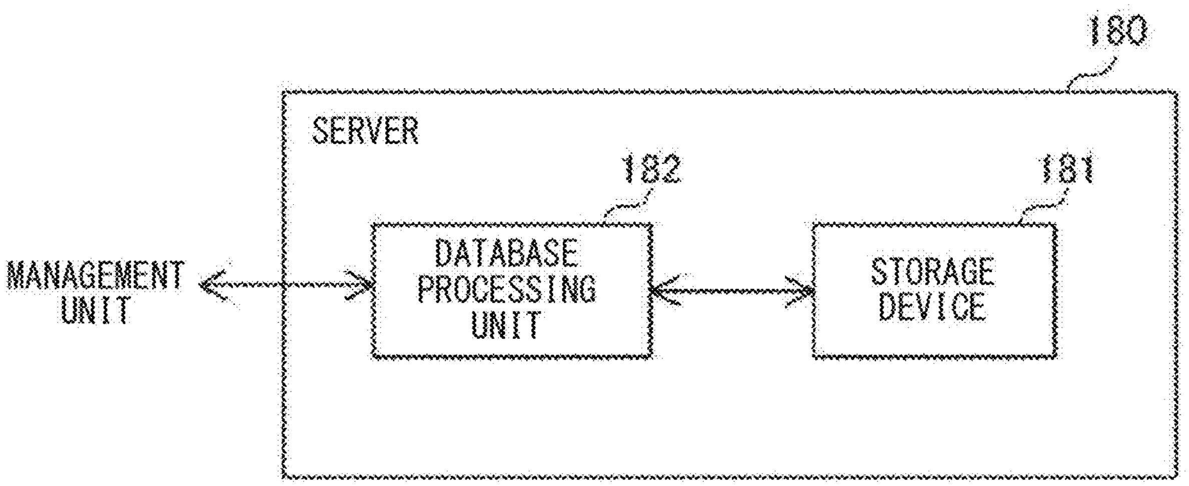
FIG. 9 shows a configuration of a server in a communication system according to an embodiment of the present disclosure.

FIG. 9 shows a configuration of a server in a communication system according to an embodiment of the present disclosure.

With reference to FIG. 9, the server 180 includes a storage device 181 and a database processing unit 182. The database processing unit 182 is implemented by, for example, processing circuitry including one or a plurality of processors. The storage device 181 is, for example, a non-volatile memory included in the processing circuitry.

For example, the storage device 181 stores therein a success/failure database in which configuration information of a network 12 is associated with success/failure information indicating whether or not this network 12 is successful.

With reference to FIG. 4 and FIG. 9, upon receiving configuration information of a new network from the generation unit 220, the setting processing unit 230 communicates with the server 180 via the TCU 111A to acquire success/failure information corresponding to the configuration information from the success/failure database in the storage device 181.

More specifically, the setting processing unit 230 transmits the configuration information received from the generation unit 220, to the database processing unit 182 in the server 180.

The database processing unit 182 acquires the corresponding success/failure information from the success/failure database by using, as a search key, the configuration information received from the setting processing unit 230. The database processing unit 182 transmits the acquired success/failure information to the setting processing unit 230.

FIG. 10 shows an example of the success/failure database stored in a storage device in a communication system according to an embodiment of the present disclosure. In the following, it is assumed that the IDs of the applications 100A, 100B, 100C, 100D, 100E, 100F, 100G, 100H, and 100J are “ID-A”, “ID-B”, “ID-C”, “ID-D”, “ID-E”, “ID-F”, “ID-G”, “ID-H”, and “ID-J”, respectively.

With reference to FIG. 10, in the success/failure database stored in the storage device 181, configuration information indicating a combination of the configuration ID, vehicle information, the ID of an application 100 in the existing network, and the ID of an application 100 to be added, is associated with success/failure information of a new network represented by the configuration information.

In this example, for convenience, it is assumed that the topologies of the hardware devices, the bandwidth of the transmission path between the hardware devices, and the like can be specified, based on the vehicle information and the ID of the application 100.

In the success/failure database, each piece of success/failure information indicates "success" or "failure", for example.

In the success/failure database, when the success/failure information corresponding to the configuration information of the new network indicates "success", this means that the new network is successful, whereas, when the success/failure information indicates "failure", this means that the new network is a failure. Moreover, "unverified" in the success/failure database means that the new network has not been subjected to success/failure verification and therefore success/failure information thereof is not present.

For example, the database processing unit 182 receives, from the setting processing unit 230, the configuration information indicating that the manufacturer of the vehicle 1 is "company A", the model of the vehicle 1 is "aaaa", the IDs of the applications 100 in the existing network are "ID-A", "ID-B", and "ID-C", and the ID of the application 100 to be added is "ID-G". Then, the database processing unit 182 acquires, from the success/failure database, the success/failure information indicating "success" by using the received configuration information as a search key, and transmits the acquired success/failure information to the setting processing unit 230.

For example, upon acquiring the feasibility information from the database in the storage device 181 as described above, the setting processing unit 230 in the management unit 200 registers, in the storage unit 240, the configuration information generated by the generation unit 220 and the feasibility information corresponding to the configuration information.

Moreover, for example, the setting processing unit 230 further acquires setting information indicating the setting content for performing communication in the new network.

More specifically, the setting processing unit 230 acquires the setting information indicating the setting content, of each function unit in the new network, which allows the function unit to perform communication at layer 4 or lower in the OSI (Open Systems Interconnection) model.

For example, the storage device 181 in the server 180 stores therein a setting database in which configuration information of a network 12 is associated with the setting contents of function units in this network 12.

FIG. 11 shows an example of a setting database stored in a storage device in a communication system according to an embodiment of the present disclosure.

Hereinafter, for convenience, the port numbers of the communication ports 120A, 120B, and 120C of the relay device 112 are "1", "2", and "3", respectively. In addition, each in-vehicle ECU 111 includes one communication port, and the port number of the communication port is "1".

With reference to FIG. 11, in the setting database in the storage device 181, for example, configuration IDs and the setting contents of function units in networks 12 indicated by the configuration IDs, e.g., IDs of VLANs for the respective communication ports 120, are registered. Hereinafter, the ID of each VLAN is also referred to as "VID".

With reference to FIG. 10 and FIG. 11, when the database processing unit 182 acquires, from the success/failure database, success/failure information indicating "success" as success/failure information corresponding to configuration information whose configuration ID is "00001", the database processing unit 182 acquires, from the setting database, VIDs of the respective function units as setting information whose configuration ID is "00001".

For example, the success/failure information in the success/failure database and the setting information in the setting database are generated based on the result of verification performed in advance while considering the logical configuration and the physical configuration of the network indicated by the corresponding configuration information.

The database processing unit 182 transmits the acquired setting information to the setting processing unit 230 in the management unit 200.

Operation Example 1

Upon acquiring, as feasibility information, success/failure information indicating "success" and setting information, the setting processing unit 230 outputs the acquired success/failure information and setting information to the notification unit 250.

Upon receiving the feasibility information from the setting processing unit 230, the notification unit 250, based on the received feasibility information, notifies at least one of the function units in the new network of the setting content for performing communication in the new network.

More specifically, the notification unit 250 specifies a function unit whose setting content needs to be changed for performing communication in the new network, among the new function unit and one or a plurality of existing function units included in the existing network, and notifies the specified function unit of the setting content.

For example, upon receiving the setting information from the setting processing unit 230, the notification unit 250 acquires, from the storage unit 240, setting information indicating the setting contents of each function unit in the existing network. Then, the notification unit 250 compares the setting information received from the setting processing unit 230 with the setting information acquired from the storage unit 240, thereby specifying one or a plurality of function units whose setting contents need to be changed for performing communication in the new network. The notification unit 250 transmits the setting information received from the setting processing unit 230, to the specified function unit(s).

For example, when a function unit whose setting content needs to be changed is not present in the new network, the notification unit 250 does not transmit the setting information to a function unit.

Upon receiving the setting information from the notification unit 250, the one or the plurality of function units in the new network perform setting change based on the received setting information. The function units in the new network communicate with each other according to the changed setting content.

For example, in the example shown in FIG. 11, the setting processing unit 230 acquires the setting information indicating that the ID of a VLAN to which the image sensor 111G including the application 100G as a new function unit belongs is "VLAN 20", and the ID of a VLAN corresponding to the communication port 120C of the relay device 112 including the application 100F is "VLAN 20, VLAN 30".

The setting processing unit 230 outputs the acquired setting information to the notification unit 250. Based on the setting information received from the setting processing unit 230, the notification unit 250 notifies the image sensor 111G and other units (not shown) in the relay device 112 of the setting content.

Figure 12:
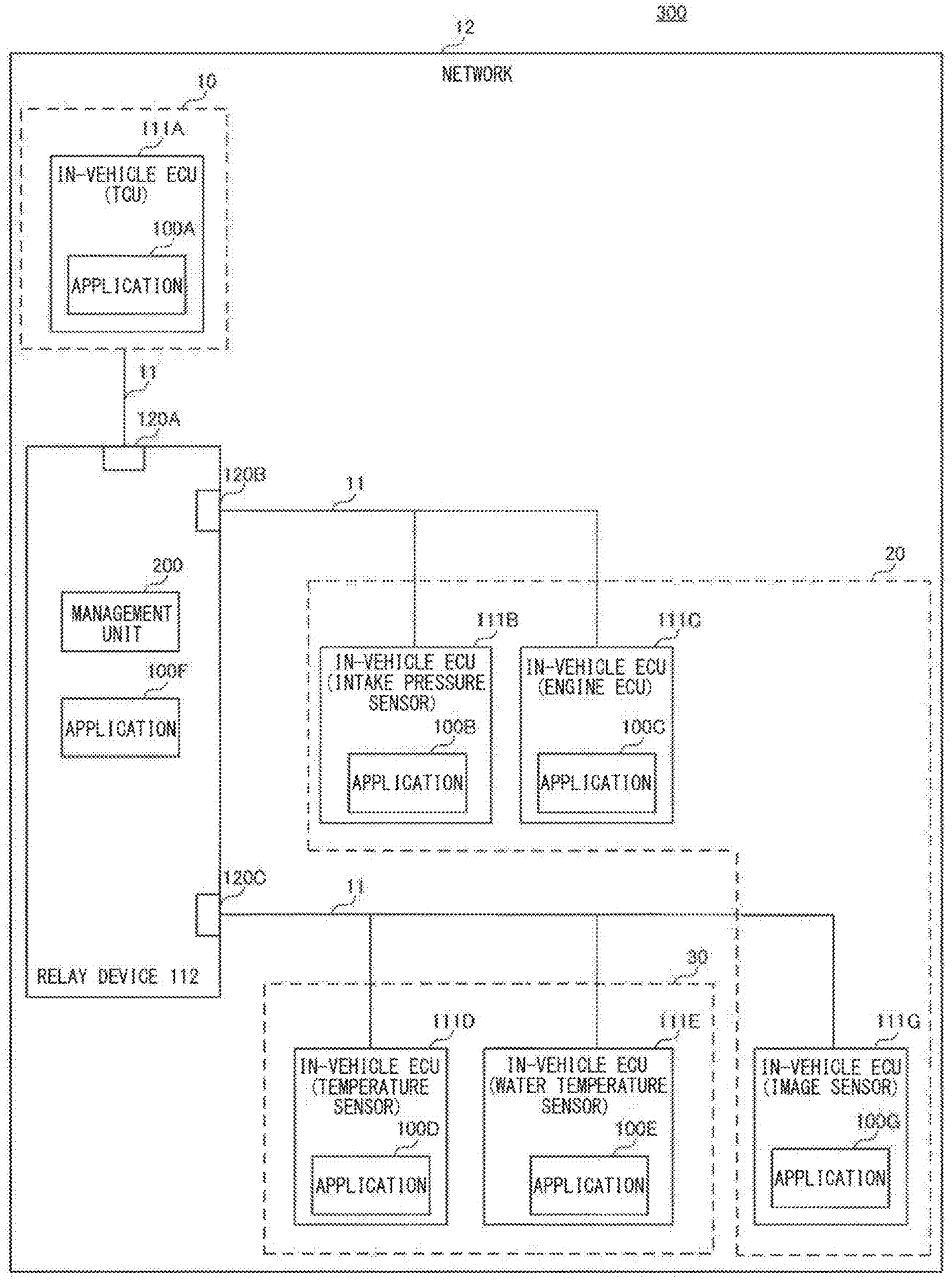
FIG. 12 shows another example of a configuration of a new network after setting change, in a vehicle communication system according to an embodiment of the present disclosure.

FIG. 12 shows another example of a configuration of a new network after setting change, in a vehicle communication system according to an embodiment of the present disclosure.

With reference to FIG. 12, in the new network shown in FIG. 5, the image sensor 111G and the relay device 112 perform setting change, based on the setting content notified from the notification unit 250. Thus, the image sensor 111G becomes able to perform communication in the VLAN 20.

Operation Example 2

Upon acquiring success/failure information indicating "failure" as feasibility information, the setting processing unit 230 outputs the acquired success/failure information to the generation unit 220.

Upon receiving the success/failure information indicating "failure" as feasibility information from the setting processing unit 230, the generation unit 220 changes the generation condition, based on the received feasibility information, and newly generates configuration information according to the changed generation condition.

For example, the generation unit 220 changes the current generation condition to a generation condition such that a part of a plurality of new function units are not added to the network 12, and newly generates configuration information of the new network according to the changed generation condition.

In addition, for example, the generation unit 220 changes the generation condition by changing the functional arrangement of the function units in the current generation condition, and newly generates configuration information of the new network according to the changed generation condition.

The generation unit 220 outputs the newly generated configuration information of the new network to the setting processing unit 230.

Upon receiving the configuration information newly generated by the generation unit 220, the setting processing unit 230 acquires success/failure information corresponding to the received configuration information from the success/failure database in the storage device 181.

Operation Flow

Figure 13:
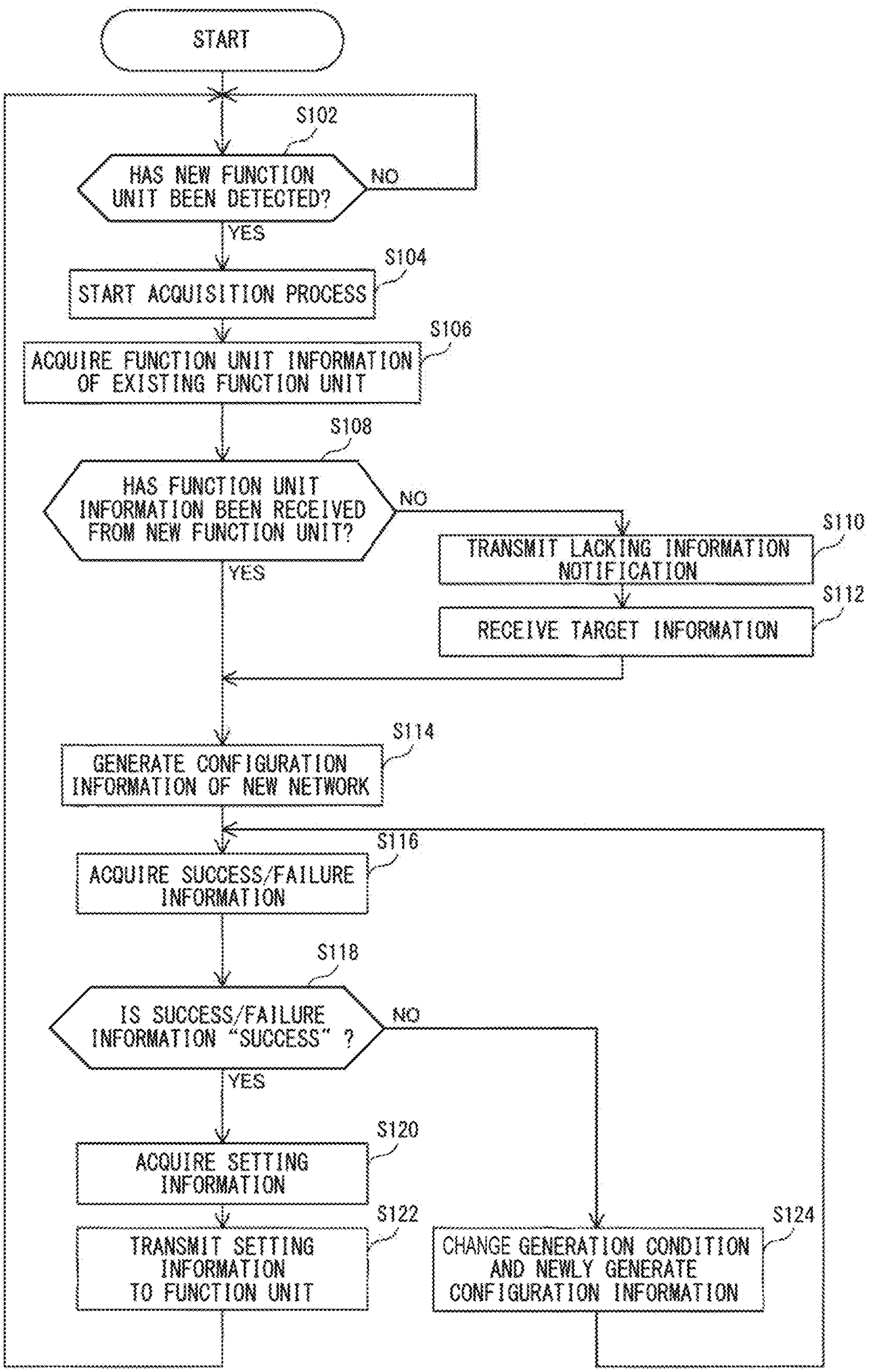
FIG. 13 is a flowchart of an operation procedure when a management unit in a communication system according to an embodiment of the present disclosure constructs a new network.

FIG. 13 is a flowchart of an operation procedure when a management unit constructs a new network in a communication system according to an embodiment of the present disclosure.

With reference to FIG. 13, firstly, the management unit 200 waits for addition of a new function unit to the network 12 (NO in step S102). Upon detecting a new function unit (YES in step S102), the management unit 200 starts an acquisition process of acquiring the function unit information of the detected new function unit and the function unit information of an existing function unit (step S104).

Next, the management unit 200 acquires the function unit information of the existing function unit by transmitting an information request notification (step S106), and then if the management unit 200 has been able to receive the function unit information from the new function unit within a predetermined time from transmission of the information request notification (YES in step S108), the management unit 200 generates configuration information of a new network, based on the acquired function unit information of the new function unit and the existing function unit (step S114).

On the other hand, if the management unit 200 cannot receive the function unit information from the new function unit even though the predetermined time has elapsed from transmission of the information request notification (NO in step S108), the management unit 200 transmits a lacking information notification to the input unit 290 (step S110), receives the target information from the input unit 290 (step S112), and generates the configuration information of the new network, based on the received target information, and the function unit information of the existing function unit (step S114).

Next, the management unit 200 acquires success/failure information corresponding to the generated configuration information, from the success/failure database in the storage device 181 of the server 180 (step S116).

Next, when the acquired success/failure information indicates "success" (YES in step S118), the management unit 200 acquires setting information indicating the setting content for performing communication in the new network, from the setting database in the storage device 181 of the server 180 (step S120).

Next, the management unit 200 transmits the acquired setting information to one or a plurality of function units in the new network (step S122).

Next, the management unit 200 waits for addition of a new function unit to the new network (NO in step S102).

On the other hand, when the acquired success/failure information indicates "failure" (NO in step S118), the management unit 200 changes the generation condition for configuration information, and newly generates configuration information according to the changed generation condition (step S124).

Next, the management unit 200 acquires success/failure information corresponding to the newly generated configuration information, from the success/failure database in the storage device 181 of the server 180 (step S116).

Figure 14:
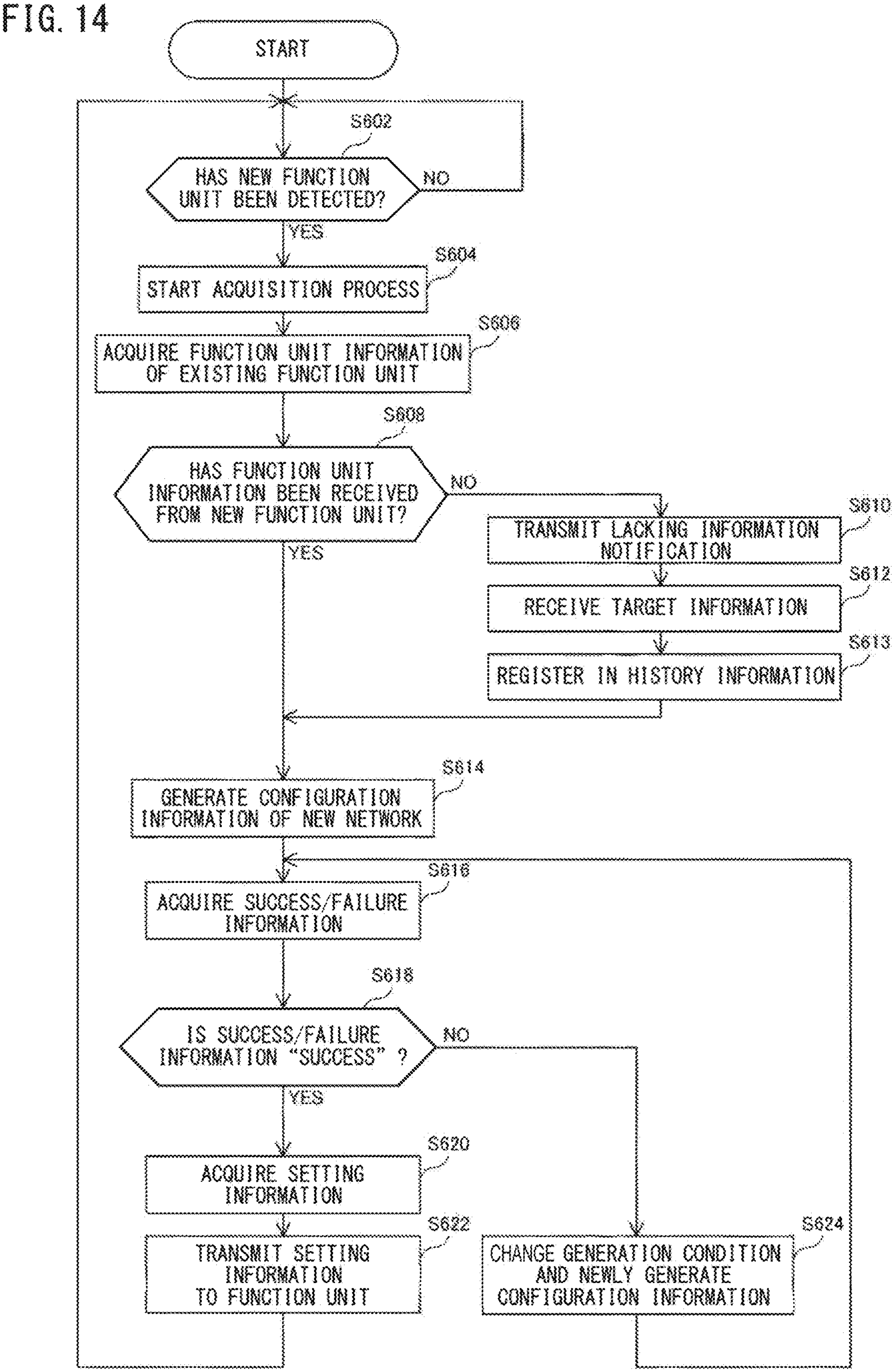
FIG. 14 is a flowchart of an operation procedure when a modification of the management unit in a communication system according to an embodiment of the present disclosure constructs a new network.

FIG. 14 is a flowchart of an operation procedure when the modification of the management unit constructs a new network in a communication system according to an embodiment of the present disclosure.

With reference to FIG. 14, firstly, the management unit 201 waits for addition of a new function unit to the network 12 (NO in step S602). Upon detecting a new function unit (YES in step S602), the management unit 201 starts an acquisition process of acquiring function unit information of the detected new function unit and the function unit information of an existing function unit (step S604).

Next, the management unit 201 transmits an information request notification to the existing function unit, or acquires the function unit information of the existing function unit based on history information (step S606), and if the management unit 201 has been able to receive the function unit information from the new function unit within a predetermined time from transmission of the information request notification (YES in step S608), the management unit 201 generates configuration information of a new network, based on the acquired function unit information of the new function unit and the existing function unit (step S614).

On the other hand, if the management unit 201 cannot receive the function unit information from the new function unit even though the predetermined time has elapsed from transmission of the information request notification (NO in step S608), the management unit 201 transmits a lacking information notification to the input unit 290 (step S610), receives the target information from the input unit 290 (step S612), and registers, in the history information in the storage unit 240, the target information such that the target information is associated with the ID of the new function unit corresponding to the target information, a communication port 120 newly connected to the new function unit, and the like.

Next, the management unit 201 generates configuration information of a new network, based on the acquired target information and the function unit information of the existing function unit (step S614).

The processes from step S616 to step S624 are similar to the processes from step S116 to step $124 in FIG. 13.

Figure 15:
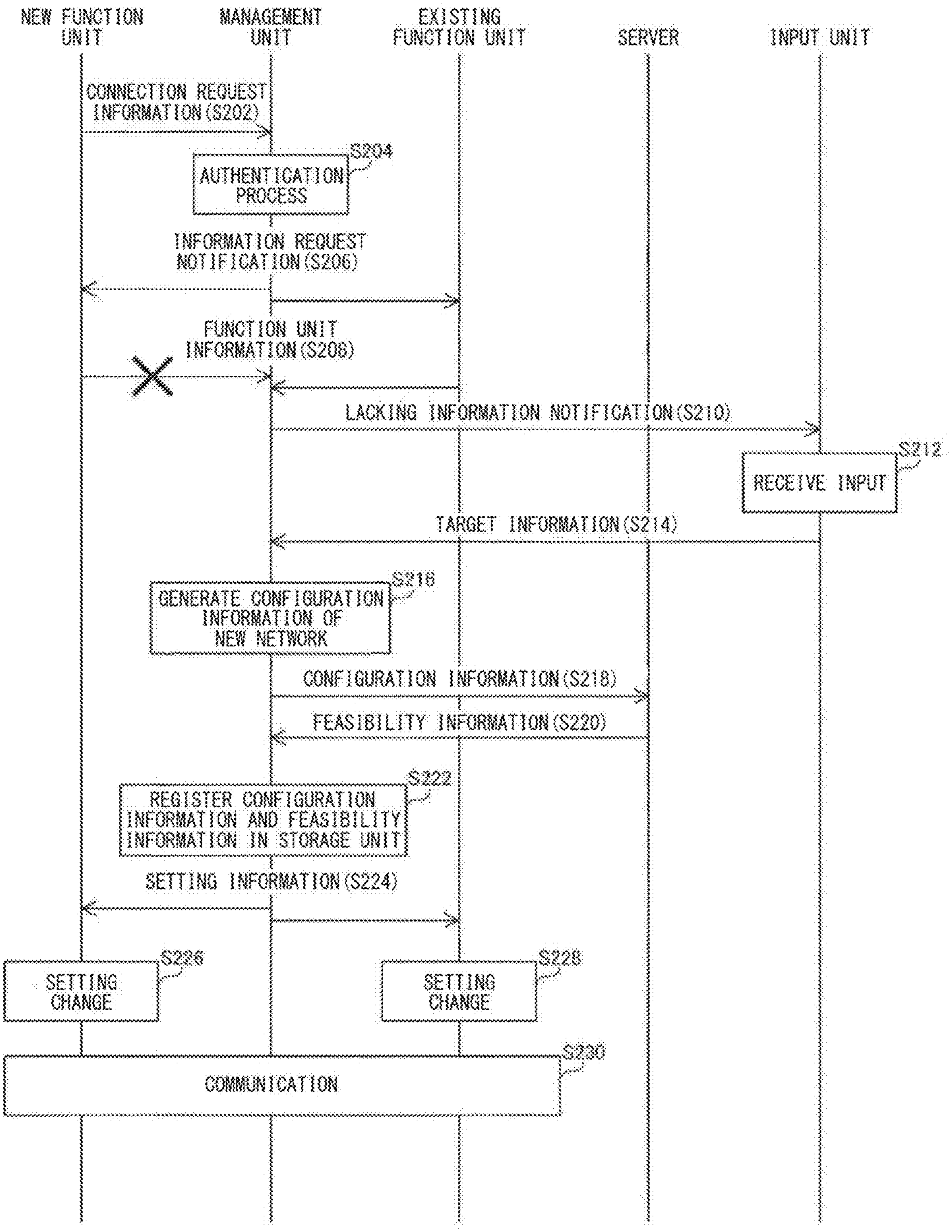
FIG. 15 shows an example of a sequence of a new network construction process in a communication system according to an embodiment of the present disclosure.

FIG. 15 shows an example of a sequence of a new network construction process in a communication system according to an embodiment of the present disclosure. FIG. 15 shows a process corresponding to the aforementioned operation example 1.

With reference to FIG. 15, firstly, a new function unit newly added to the network 12 transmits connection request information to the management unit 200 (step S202).

Next, upon receiving the connection request information from the new function unit, the management unit 200 detects this new function unit, and performs an authentication process for the new function unit (step S204).

Next, when the authentication of the new function unit has been successful, the management unit 200 transmits an information request notification for requesting function unit information to an existing function unit and the new function unit (step S206).

Next, the existing function unit transmits, as a response to the information request notification, its own function unit information of the type designated in the information request notification, to the management unit 200. Meanwhile, the new function unit, because it does not have a function of transmitting the function unit information to the management unit 200, does not transmit the function unit information (step S208).

Next, since the management unit 200 cannot receive the function unit information from the new function unit even though a predetermined time has elapsed from transmission of the information request notification, the management unit 200 transmits a lacking information notification to the input unit 290 (step S210).

Next, the input unit 290 receives an input operation of target information by the user who has confirmed the screen as described above, for example (step S212), and transmits target information based on the content of the operation to the management unit 200 (step S214).

Next, the management unit 200 generates configuration information of a new network, based on the function unit information received from the existing function unit and the input unit 290 (step S216).

Next, the management unit 200 transmits the generated configuration information to the server 180 (step S218).

Next, the server 180 acquires, from the database, feasibility information indicating feasibility of the new network and corresponding to the configuration information received from the management unit 200, and transmits the acquired feasibility information to the management unit 200 (step S220).

Next, the management unit 200 registers the generated configuration information and the feasibility information received from the server 180, in the storage unit 240 (step S222).

Next, upon receiving, as the feasibility information, the success/failure information indicating "success" and the setting information, the management unit 200 transmits the setting information to the existing function unit and the new function unit (step S224).

Next, the new function unit performs setting change, based on the setting information received from the management unit 200 (step S226). Additionally, the existing function unit performs setting change, based on the setting information received from the management unit 200 (step S228).

Next, the new function unit and the existing function unit in the new network communicate with each other according to the changed setting content (step S230).

Figure 16:
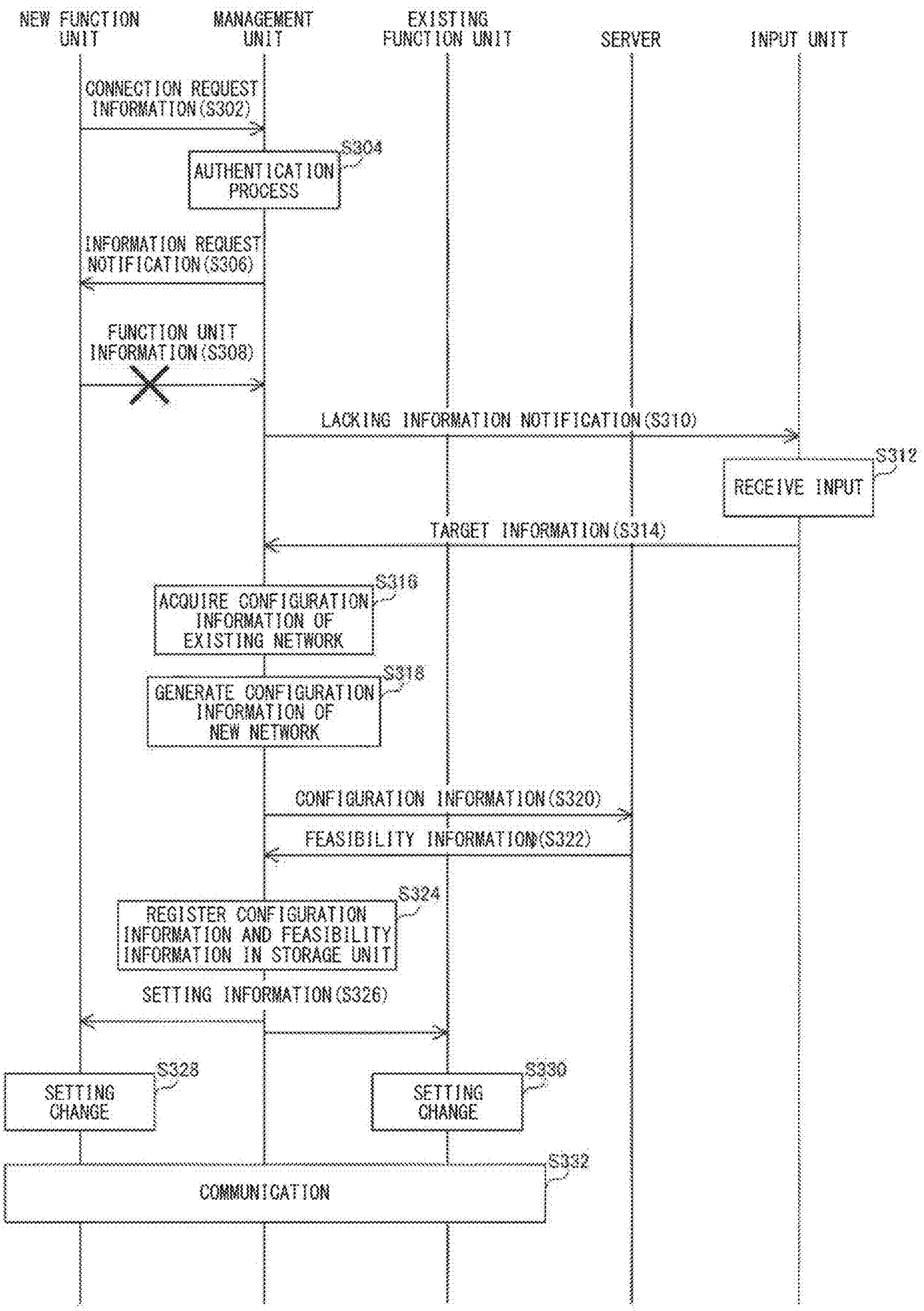
FIG. 16 shows another example of a sequence of a new network construction process in a communication system according to an embodiment of the present disclosure.

FIG. 16 shows another example of a sequence of a new network construction process in a communication system according to an embodiment of the present disclosure. FIG. 16 shows a process corresponding to the aforementioned operation example 1.

With reference to FIG. 16, firstly, a new function unit newly added to the network 12 transmits connection request information to the management unit 200 (step S302).

Next, upon receiving the connection request information from the new function unit, the management unit 200 detects this new function unit, and performs an authentication process for the new function unit (step S304).

Next, when the authentication of the new function unit has been successful, the management unit 200 transmits an information request notification for requesting function unit information to the new function unit (step S306).

Next, the new function unit, because it does not have a function of transmitting the function unit information to the management unit 200, does not transmit the function unit information (step S308).

Next, since the management unit 200 cannot receive the function unit information from the new function unit even though the predetermined time has elapsed from transmission of the information request notification, the management unit 200 transmits a lacking information notification to the input unit 290 (step S310).

Next, the input unit 290 receives an input operation of target information by the user who has confirmed the screen as described above, for example (step S312), and transmits target information based on the content of the operation to the management unit 200 (step S314).

Next, the management unit 200 acquires the configuration information of the existing network from the storage unit 240 (step S316).

Next, the management unit 200 generates configuration information of a new network, based on the target information received from the input unit 290, and the configuration information received from the storage unit 240 (step S318).

The processes from step S320 to step S332 are similar to the processes from step S218 to step S230 in FIG. 15.

Figure 17:
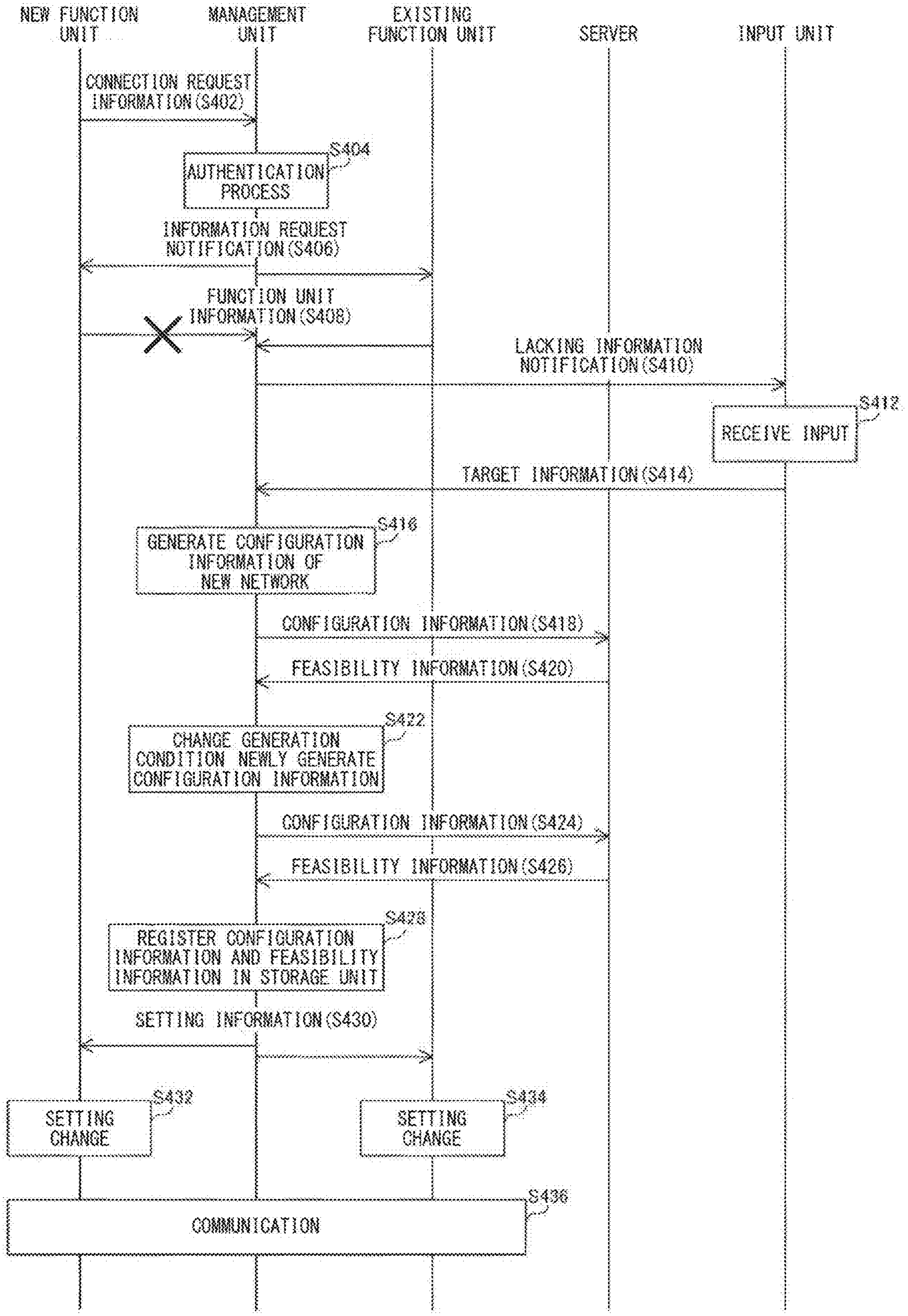
FIG. 17 shows another example of a sequence of a new network construction process in a communication system according to an embodiment of the present disclosure.

FIG. 17 shows another example of a sequence of a new network construction process in a communication system according to an embodiment of the present disclosure. FIG. 17 shows a process corresponding to the aforementioned operation example 2.

The processes from step S402 to step S420 in FIG. 17 are similar to the processes from step S202 to step S220 in FIG. 15.

Next, when the feasibility information includes the success/failure information indicating "failure", the management unit 200 changes the generation condition for configuration information, and newly generates configuration information according to the changed generation condition (step S422).

Next, the management unit 200 transmits the newly generated configuration information to the server 180 via the wireless base station device 161 (step S424).

Next, the server 180 acquires, from the database, feasibility information indicating feasibility of the new network and corresponding to the configuration information received from the management unit 200, and transmits the acquired feasibility information to the management unit 200 via the wireless base station device 161 (step S426).

The processes from step S428 to step S436 are similar to the processes from step S222 to step S230 in FIG. 15.

Figure 18:
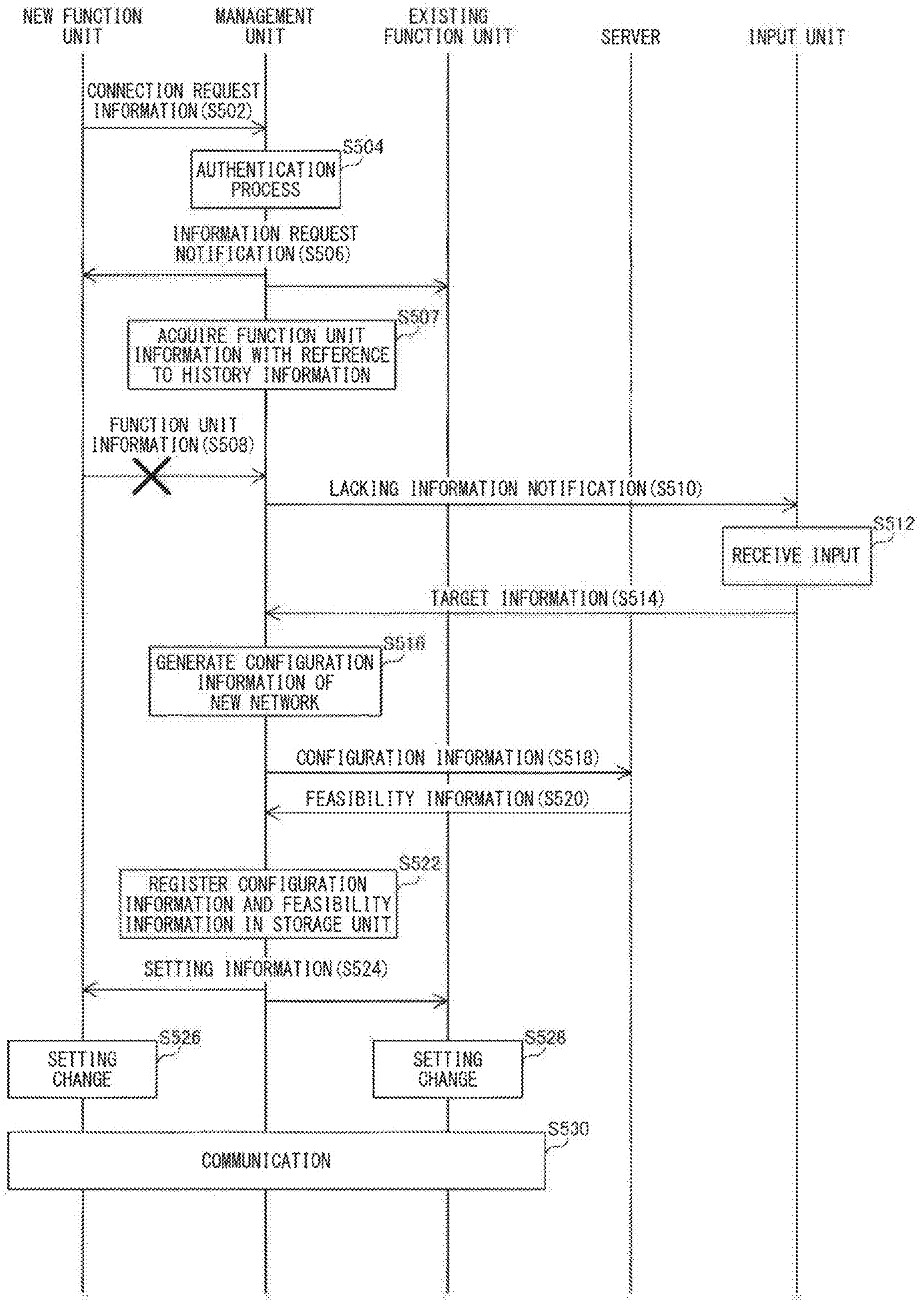
FIG. 18 shows an example of a sequence of a new network construction process in a communication system according to an embodiment of the present disclosure.

FIG. 18 shows an example of a sequence of a new network construction process in a communication system according to an embodiment of the present disclosure. FIG. 18 shows a process corresponding to the aforementioned operation example 1 of the management unit 201.

With reference to FIG. 18, firstly, a new function unit newly added to the network 12 transmits connection request information to the management unit 201 (step S502).

Next, upon receiving the connection request information from the new function unit, the management unit 201 detects this new function unit, and performs an authentication process for the new function unit (step S504).

Next, when the authentication of the new function unit has been successful, the management unit 201 transmits an information request notification for requesting function unit information to an existing function unit and the new function unit. Here, the management unit 201 refers to the history information in the storage unit 240, and does not transmit an information request notification to an existing function unit registered in the history information (step S506).

Next, the management unit 201 refers to the history information in the storage unit 240, and acquires registered target information as the function unit information of the existing function unit (step S507).

The processes from step S508 to step S530 are similar to the processes from step S208 to step S230 in FIG. 15.

In the management unit 200 according to an embodiment of the present disclosure, the configuration is such that, if an in-vehicle ECU 111 or an external device is added to the network 12, the detection unit 210 detects, as a new function unit, an application 100 included in the in-vehicle ECU 111 or the external device. However, the present disclosure is not limited thereto. The detection unit 210 may detect, as a new function unit, an in-vehicle ECU 111 or an external device, to be added to the network 12, in which no application 100 is installed.

In addition, in the management unit 200 according to an embodiment of the present disclosure, the configuration is such that, when the generation unit 220 receives success/failure information indicating "failure" from the setting processing unit 230, the generation unit 220 changes the generation condition for configuration information, and newly generates configuration information according to the changed generation condition. However, the present disclosure is not limited thereto. Even when receiving the success/failure information indicating "failure", the generation unit 220 may have a configuration such that it does not newly generate configuration information. In this case, for example, the notification unit 250 notifies the new function unit that the new function unit is not added to the network 12.

In addition, in the management unit 200 according to an embodiment of the present disclosure, the configuration is such that when the generation unit 220 has acquired configuration information of an existing network from the storage unit 240, the generation unit 220 generates configuration information of a new network, based on function unit information of a new function unit and the acquired configuration information of the existing network. However, the present disclosure is not limited thereto. Even when acquiring the configuration information of the existing network from the storage unit 240, the generation unit 220 may have a configuration such that it acquires function unit information from one or a plurality of existing function units, according to the content of the function unit information of the new function unit, and generates configuration information of a new network, based on the function unit information of the new function unit, the function unit information of the existing function unit, and the acquired configuration information of the existing network.

In addition, in the management unit 200 according to an embodiment of the present disclosure, the configuration is such that the notification unit 250 specifies a function unit whose setting content needs to be changed, among a new function unit and one or a plurality of existing function units included in an existing network, and notifies the specified function unit of the setting content. However, the present disclosure is not limited thereto. The notification unit 250 may have a configuration such that it does not specify a function unit whose setting content needs to be changed, and notifies all the function units in the new network of the setting content.

In addition, in the communication system 400 according to an embodiment of the present disclosure, the configuration is such that the management unit 200 is included in the relay device 112 in the network 12. However, the present disclosure is not limited thereto. A part or all of the units in the management unit 200 may be included in a device other than the relay device 112 in the network 12, or may be placed outside the network 12. Through a configuration in which the management unit 200 is included in a relay device 112 in a star-type topology network as shown in FIG. 2, for example, the management unit 200 can perform the above-described processes more efficiently.

In addition, the management unit 200 may have a configuration that does not include the setting processing unit 230 and the notification unit 250. Additionally, the storage unit 240 may be placed outside the relay device 112 that is an example of the management device.

In addition, the management unit 200 may be implemented by the server 180. In this case, a part or the entirety of the functions of the management unit 200 according to an embodiment of the present disclosure may be provided by cloud computing. That is, the management unit 200 according to an embodiment of the present disclosure may be implemented by a plurality of cloud servers or the like.

Incidentally, a technology capable of flexibly constructing a network of a new configuration while maintaining stable operation in the network, has been desired.

For example, when constructing a new network by newly adding a function unit to a network, there are cases where communication required by an upper layer cannot be realized due to the network configuration and restriction of a lower layer.

As an example of such a network configuration and restriction of a lower layer, there is restriction on a communication band of a physical layer. In particular, a network for which cost reduction is required, such as a network including an in-vehicle function unit such as an in-vehicle ECU, is subject to a restriction on the communication band as described above. Therefore, it is sometimes difficult to add a new function unit to the network while maintaining stable operation in the network.

In contrast to the above case, in the relay device according to an embodiment of the present disclosure, according to the above configuration, it is possible to construct a new network by using a verification result, of the feasibility of the network, which has been generated in advance. Thus, it is possible to construct, as a new network, a network whose feasibility has been ensured while considering the logical configuration and the physical configuration thereof, for example. Therefore, it is possible to inhibit occurrence of a delay, in communication of high importance, which may be caused by addition of a new function unit to the network.

The various processes (various functions) of the above-described embodiments may be realized by processing circuitry including one or more processors. In addition to the one or more processors, the processing circuitry may include an integrated circuit or the like in which one or more memories, various analog circuits, and various digital circuits are combined. The one or more memories have, stored therein, programs (instructions) that cause the one or more processors to execute the processes. The one or more processors may execute the processes according to the program(s) read out from the one or more memories, or may execute the processes according to a logic circuit designed in advance to execute the processes. The above processors may be various processors which are compatible with computer control, such as a CPU (Central Processing Unit), a GPU (Graphics Processing Unit), a DSP (Digital Signal Processor), an FPGA (Field Programmable Gate Array), an ASIC (Application Specific Integrated Circuit), or the like. Physically separated ones of the plurality of processors may execute the processes in cooperation with each other. For example, the processors installed in physically separated computers may execute the processes in cooperation with each other through a network such as a LAN (Local Area Network), a WAN (Wide Area Network), or the Internet. The program(s) may be installed in the memory from an external server device or the like through the network. Alternatively, the program may be distributed in a state of being stored in a recording medium such as a CD-ROM (Compact Disc Read Only Memory), a DVD-ROM (Digital Versatile Disk Read Only Memory), or a semiconductor memory, and may be installed in the memory from the recording medium.

The above-described embodiments are illustrative in all aspects and should be considered not restrictive. The scope of the present invention is not limited by the configuration of the above-described embodiment but is defined by the claims, and is intended to include meanings equivalent to the scope of the claims and all modifications within the scope.

The above description includes the features in the additional notes below.

Additional Note 1

A management device, comprising:

a detection unit that detects addition of a function unit to a network including one or a plurality of in-vehicle function units;

an acquisition unit that acquires function unit information of each in-vehicle function unit, and if target information, which is function unit information of a new function unit that is the function unit the addition of which has been detected by the detection unit, cannot be acquired from the new function unit, acquires the target information by transmitting a lacking information notification for requesting a user to provide the target information; and a generation unit that, based on each function unit information acquired by the acquisition unit, generates configuration information of a new network which is the network further including the new function unit, wherein the acquisition unit acquires the target information based on a content of an operation performed by the user in response to the lacking information notification, and the acquisition unit transmits the lacking information notification to a navigation device in the network, and acquires the target information based on a content of an operation performed by the user on the navigation device.

Additional Note 2

A managing device comprising a processing circuit, wherein the processing circuit detects addition of a function unit to a network including one or a plurality of in-vehicle function units, acquires function unit information of each in-vehicle function unit, and if target information, which is function unit information of a new function unit that is the function unit the addition of which has been detected by the detection unit, cannot be acquired from the new function unit, acquires the target information by transmitting a lacking information notification for requesting a user to provide the target information, and based on each function unit information acquired by the acquisition unit, generates configuration information of a new network which is the network further including the new function unit.

REFERENCE SIGNS LIST

1 vehicle
11 Ethernet cable
12 network
100, 100A, 100B, 100C, 100D, 100E, 100F, 100G, 100H, 100J application
111, 111A in-vehicle ECU
111B in-vehicle ECU (intake pressure sensor)
111C in-vehicle ECU (engine ECU)
111D in-vehicle ECU (temperature sensor)
111E in-vehicle ECU (water temperature sensor)
111G in-vehicle ECU (image sensor)
112 relay device
113 external device
120, 120A, 120B, 120C communication port
161 wireless base station device
170 external network
180 server
181 storage device
182 database processing unit
200, 201 management unit
210 detection unit
220 generation unit
230 setting processing unit
240 storage unit
250 notification unit
270, 271 acquisition unit
290 input unit
300 vehicle communication system
400 communication system

What is claimed is:

1. A management device, comprising:

a detection circuitry configured to detect addition of a function circuitry to a network including one or a plurality of in-vehicle function circuitries;

an acquisition circuitry configured to acquire function circuitry information of each in-vehicle function circuitry, and to be able to execute a plurality of kinds of acquisition processes regarding target information which is function circuitry information of a new function circuitry that is the function circuitry detected by the detection circuitry; and a generation circuitry configured to, based on each function circuitry information acquired by the acquisition circuitry, generate configuration information of a new network which is the network further including the new function circuitry, wherein the plurality of kinds of acquisition processes include:

a first process of acquiring the target information from the new function circuitry that is currently added, a second process of, if the target information cannot be acquired from the new function circuitry, acquiring the target information by transmitting lacking information notification for requesting a user to provide the target information, and a third process of acquiring the target information, of another new function circuitry, which was previously acquired by the second process and registered in a storage circuitry, from the storage circuitry.

2. The management device according to claim 1, wherein when there are a plurality of the new function circuitries, the acquisition circuitry includes, in the lacking information notification, addition positions of the plurality of the new function circuitries to the network.

3. The management device according to claim 2, wherein the acquisition circuitry stores therein history information in which the new function circuitry, the target information of which has been acquired by transmitting the lacking information notification, is associated with the target information, and when another new function circuitry has been newly detected by the detection circuitry, the acquisition circuitry, based on the history information, acquires the function circuitry information of the one or the plurality of in-vehicle function circuitries, the target information of which has been acquired by transmitting the lacking information notification.

4. The management device according to claim 2, further comprising a setting processing circuitry configured to acquire, from a database in a storage device, feasibility information indicating feasibility of the new network and corresponding to the configuration information generated by the generation circuitry.

5. The management device according to claim 1, wherein the acquisition circuitry stores therein history information in which the new function circuitry, the target information of which has been acquired by transmitting the lacking information notification, is associated with the target information, and when another new function circuitry has been newly detected by the detection circuitry, the acquisition circuitry, based on the history information, acquires the function circuitry information of the one or the plurality of in-vehicle function circuitries, the target information of which has been acquired by transmitting the lacking information notification.

6. The management device according to claim 5, further comprising a setting processing circuitry configured to acquire, from a database in a storage device, feasibility information indicating feasibility of the new network and corresponding to the configuration information generated by the generation circuitry.

7. The management device according to claim 1, further comprising a setting processing circuitry configured to acquire, from a database in a storage device, feasibility information indicating feasibility of the new network and corresponding to the configuration information generated by the generation circuitry.

8. A vehicle communication management method used in a management device, the method comprising:

detecting addition of a function circuitry to a network including one or a plurality of in-vehicle function circuitries;

acquiring function circuitry information of each in-vehicle function circuitry;

executing at least one of a plurality of kinds of acquisition processes regarding target information which is function circuitry information of a new function circuitry that is the function circuitry that has been detected; and based on each function circuitry information acquired, generating configuration information of a new network which is the network further including the new function circuitry, wherein the plurality of kinds of acquisition processes include:

a first process of acquiring the target information from the new function circuitry that is currently added, a second process of, if the target information cannot be acquired from the new function circuitry, acquiring the target information by transmitting lacking information notification for requesting a user to provide the target information, and a third process of acquiring the target information, of another new function circuitry, which was previously acquired by the second process and registered in a storage circuitry, from the storage circuitry.

9. A non-transitory computer readable storage medium storing a vehicle communication management program used in a management device, the program causing a computer to function as:

a detection circuitry configured to detect addition of a function circuitry to a network including one or a plurality of in-vehicle function circuitries;

an acquisition circuitry configured to acquire function circuitry information of each in-vehicle function circuitry, and to be able to execute a plurality of kinds of acquisition processes regarding target information which is function circuitry information of a new function circuitry that is the function circuitry detected by the detection circuitry; and a generation circuitry configured to, based on each function circuitry information acquired by the acquisition circuitry, generate configuration information of a new network which is the network further including the new function circuitry, wherein the plurality of kinds of acquisition processes include:

a first process of acquiring the target information from the new function circuitry that is currently added, a second process of, if the target information cannot be acquired from the new function circuitry, acquiring the target information by transmitting lacking information notification for requesting a user to provide the target information, and a third process of acquiring the target information, of another new function circuitry, which was previously acquired by the second process and registered in a storage circuitry, from the storage circuitry.

* * * * *